United States Patent
Horimai et al.

(10) Patent No.: US 11,789,285 B2
(45) Date of Patent: Oct. 17, 2023

(54) POLARIZATION BEAM SPLITTER, SURFACE LIGHT SOURCE DEVICE, AND DISPLAY DEVICE

(71) Applicant: Egarim Corporation Japan, Shizuoka (JP)

(72) Inventors: Hideyoshi Horimai, Numazu (JP); Toshihiro Kasezawa, Shizuoka (JP); Shinobu Yamamoto, Numazu (JP)

(73) Assignee: Egarim Corporation Japan, Shizuoka (JP)

( * ) Notice: Subject to any disclaimer, the term of this patent is extended or adjusted under 35 U.S.C. 154(b) by 422 days.

(21) Appl. No.: 16/635,293

(22) PCT Filed: Jul. 25, 2018

(86) PCT No.: PCT/JP2018/027848
§ 371 (c)(1),
(2) Date: Jan. 30, 2020

(87) PCT Pub. No.: WO2019/026720
PCT Pub. Date: Feb. 7, 2019

(65) Prior Publication Data
US 2021/0088800 A1    Mar. 25, 2021

(30) Foreign Application Priority Data
Aug. 4, 2017    (JP) .................................. 2017-151885

(51) Int. Cl.
*G02B 27/28* (2006.01)
*G02F 1/1335* (2006.01)

(52) U.S. Cl.
CPC ........ *G02B 27/283* (2013.01); *G02F 1/13355* (2021.01); *G02F 1/133528* (2013.01)

(58) Field of Classification Search
CPC ............. G02F 1/13355; G02F 1/33528; G02B 27/283
(Continued)

(56) References Cited

U.S. PATENT DOCUMENTS

| | | | |
|---|---|---|---|
| 6,594,085 B2 | 7/2003 | Ohtaka et al. | |
| 2002/0021498 A1* | 2/2002 | Ohtaka | G02B 27/0172 359/638 |
| 2015/0318010 A1* | 11/2015 | Asada | G11B 7/1353 369/103 |

FOREIGN PATENT DOCUMENTS

| | | |
|---|---|---|
| JP | 4-360103 | 12/1992 |
| JP | 11-271533 | 10/1999 |

(Continued)

OTHER PUBLICATIONS

International Search Report PCT/JP2018/027848 (WO 2019/026720) (2018) (3 pages).
(Continued)

*Primary Examiner* — Edward J Glick
*Assistant Examiner* — William D Peterson
(74) *Attorney, Agent, or Firm* — Jeffrey I. Auerbach; Auerbach, LLC

(57) ABSTRACT

A polarization beam splitter is disclosed having reduced size and weight relative to the prior art. The disclosed polarization beam splitter has a translucent substrate and a hologram layer provided on a front surface of the substrate. The polarization beam splitter is capable of separating S-polarized light from light incident on the hologram layer via the substrate, wherein the substrate has a back surface facing the front surface on which the hologram layer is provided, and a side surface connecting the front surface and the back surface. The hologram layer has a hologram for diffracting circularly polarized light incident on the hologram layer from outside the substrate via either the back surface or a portion of the side surface to generate S-polarized light having an extinction ratio of 50:1 or greater toward the other of the back surface or the portion of the side surface.

13 Claims, 17 Drawing Sheets

(58) Field of Classification Search
USPC .......................................................... 349/483
See application file for complete search history.

(56) References Cited

FOREIGN PATENT DOCUMENTS

| JP | 2001-311904 | 11/2001 |
| JP | 2002-098928 | 4/2002 |
| JP | 2003-167127 | 6/2003 |
| JP | 2010-271565 | 12/2010 |

OTHER PUBLICATIONS

Written Opinion of the International Searching Authority PCT/JP2018/027848 (WO2019/026720) (2018) (7 pages).

* cited by examiner (A)

(B)

(A)

(B)

POLARIZATION BEAM SPLITTER, SURFACE LIGHT SOURCE DEVICE, AND DISPLAY DEVICE

CROSS REFERENCE TO RELATED APPLICATIONS AND CLAIM TO PRIORITY

This Application is a national stage application of International Application No. PCT/JP2018/027858, filed Jul. 25, 2018, which claims priority to Japanese Application No. JP 2017-151885, filed Aug. 4, 2017, which applications are herein incorporated by reference in their entireties and to which priority is claimed.

TECHNICAL FIELD

The present invention relates to a holographic optical element using a hologram, and in particular, to a polarization beam splitter using a hologram, the polarization beam splitter being capable of selectively separating S-polarized light, as well as a surface light source device and a display device using the same.

BACKGROUND ART

A liquid crystal display element has been conventionally often used as a display unit of a display device. In the liquid crystal display element, liquid crystal is aligned between two substrates, and a voltage of each pixel electrode provided on the substrates is controlled so as to change an alignment state of the liquid crystal in an area where pixel electrodes are arranged and thereby change an polarization state of light passing through the liquid crystal for each pixel. As a result, an image is displayed by controlling brightness of the pixels on the basis of difference of the polarization state. In a transmissive liquid crystal display element, a polarizing plate that transmits only specific linearly polarized light is provided on each of outer surfaces of two substrates. By the polarizing plate on the incident side, only specific linearly polarized light enters the liquid crystal display element, and a polarization state of the light is changed while the linearly polarized light passes through the liquid crystal so that brightness is controlled by a proportion of a linearly polarized light component capable of passing through the polarizing plate on the emission side. Similarly, in a reflective liquid crystal display element in which light is made incident from one surface, reflected by a pixel electrode and emitted from the same surface, a polarizing plate that transmits only specific linearly polarized light is provided on one surface side. Liquid crystal changes a polarization state of the light while the linearly polarized light travels to the pixel electrode and returns therefrom so that brightness is controlled by a proportion of the linearly polarized light component. A liquid-crystal-on-silicon (LCOS) device in which liquid crystal is mounted on a surface of a silicon chip has been known as one of the reflective liquid crystal display elements.

The reflective liquid crystal display element is used for a projector that is a display device for projecting an image, a head mounted display (HMD) that is a display device to be installed on that the head of the user and displays an image in front of eyes, and the like. However, since an incident surface of light is identical with a display surface of an image, the reflective liquid crystal display element needs a polarization beam splitter for separating optical paths of light emitted from a light source to the liquid crystal display device and light emitted from the liquid crystal display device. Patent Document 1 describes an HMD using a reflective liquid crystal display element. The HMD of Patent Document 1 includes a liquid crystal unit including a light source, a light guide member and a liquid crystal display element, and a polarization beam splitter is fixed on a display surface of the liquid crystal display element as the light guide member. Light incident from the light source is reflected toward the liquid crystal display element by the polarization beam splitter, and an image emitted from the liquid crystal display element is transmitted via the polarization beam splitter. In the HMD of Patent Document 1, a polarizing plate that transmits S-polarized light is provided on an optical path closer to the light source than the polarization beam splitter, and the HMD is configured such that the S-polarized light passing through the polarizing plate enters the polarization beam splitter and is reflected toward the liquid crystal display element by a reflection surface provided on an inclined surface.

FIG. 19 is a diagram illustrating a display operation in a conventional reflective display device 300. The display device 300 includes a reflective liquid crystal display element 301, a polarization beam splitter 302 disposed on a front surface side thereof, and a polarizing plate 303 disposed closer to a light source (not shown) than the polarization beam splitter 302. The liquid crystal display element 301 reflects incident S-polarized light by a pixel electrode to display an image on a display surface of the liquid crystal display element. The liquid crystal display element 301 is configured such that light for an ON pixel 304 rotates in its polarization direction when passing through a liquid crystal layer by just 90° onto the display surface, and light for an OFF pixel 305 does not rotate in its polarization direction when passing through the liquid crystal layer. The polarization beam splitter 302 typically is of a cube type in which inclined surfaces of two right angle prisms are made opposed and pasted together, and a dielectric multilayer film is deposited on an inclined surface 306 inclined by 45° to reflect an S-polarized component and transmit a P-polarized component. The polarizing plate 303 transmits the S-polarized component and blocks the P-polarized component.

The polarizing plate 303 disposed in front of the polarization beam splitter 302 makes the light 310 from the light source into S-polarized light 311 to enter the polarization beam splitter 302. The S-polarized light 311 is reflected toward the liquid crystal display element 301 by the inclined surface 306 of the polarization beam splitter 302 to enter the liquid crystal display element 301. Light incident on the ON pixel 304 of the liquid crystal display element 301 is rotated by 90° in its polarization direction to become P-polarized light 312 when passing through the liquid crystal layer, emitted from a front surface of the liquid crystal display element 301, and passes through the inclined surface 306 of the polarization beam splitter 302 to be displayed. In contrast, light incident on the OFF pixel 305 of the liquid crystal display element 301 does not change its polarization direction even after passing through the liquid crystal layer, and emitted from the front surface of the liquid crystal display element 301 as S-polarized light 313 to be reflected by the inclined surface 306 of the polarization beam splitter 302, resulting in non-display pixel.

PRIOR ART DOCUMENTS

Patent Documents

Patent Document 1 JP-A-2017-68044

SUMMARY OF INVENTION

Problem to be Solved

A wearable display such as a head mounted display needs to be mounted on head, so that overall size and weight reduction has been required. However, the reflective liquid crystal display element must be provided with the polarization beam splitter adjacent to the display surface of the display element. A cube-type polarization beam splitter has problems that: prisms are heavy; and light is reflected by and transmitted via the inclined surface inclined by 45° so that a vertical length and a lateral length are same in the cross section, disadvantageously increasing the size of the device.

Also, splitting of light by the conventional polarization beam splitter uses reflection and transmission by the reflection surface, so that only two types of optical paths can be selected, one of which transmits light incident perpendicularly to one surface of the polarization beam splitter of a cube type and the other of which reflects light by the reflection surface perpendicular to the one of the optical paths. This limits optical system design layout.

Also, in order to increase a viewing angle of the display element, a caliber for illumination light and thus the polarization beam splitter also needs to be larger.

Therefore, the optical system inevitably becomes larger and its weight increases. Furthermore, in the conventional polarization beam splitter, extinction ratio (ratio of S-polarized light and P-polarized light) is lowered when an angle of an incident light changes. Therefore, it is difficult for the conventional polarization beam splitter to be combined with illumination light having a wide viewing angle.

In addition, in the conventional polarization beam splitter, extinction ratio of P-polarized transmitted light is high but extinction ratio of reflected light is low so that it is difficult to directly obtain S-polarized light having high extinction ratio. In a case of color display using a field sequential method (time division method), illumination lights of red, green, blue are sequentially emitted onto the display element. However, it is difficult for the conventional polarization beam splitter to provide high extinction ratio in a wide wavelength band.

The present invention has been conceived in light of the above-mentioned problems and aims to provide a polarization beam splitter capable of solving at least some of the problems, as well as a surface light source device and a display device using the same.

Solution to Problem

In order to solve the above-mentioned problems, a polarization beam splitter of the present invention includes a translucent substrate and a hologram layer provided on a front surface of the substrate. The polarization beam splitter can separate S-polarized light from light incident on the hologram layer via the substrate. The substrate includes a back surface opposite to the front surface on which the hologram layer is provided and a side surface connecting the front surface and the back surface, and the hologram layer includes a hologram for diffracting circularly polarized light incident on the hologram layer from outside the substrate via either the back surface or a portion of the side surface to generate S-polarized light having extinction ratio of 50:1 or greater toward the other of the back surface or the portion of the side surface.

Also, a polarization beam splitter of the present invention includes a translucent substrate and a hologram layer provided on a front surface of the substrate. The polarization beam splitter can separate S-polarized light from light incident on the hologram layer via the substrate. The substrate includes a back surface opposite to the front surface on which the hologram layer is provided and a side surface connecting the front surface and the back surface, and the hologram layer includes a hologram that diffracts at least some of S-polarized light among light incident on the hologram layer from outside the substrate via the back surface to generate S-polarized light toward a portion of the side surface but diffracts no P-polarized light.

Also, a polarization beam splitter of the present invention includes a translucent substrate and a hologram layer provided on a front surface of the substrate. The polarization beam splitter can separate S-polarized light from light incident on the hologram layer via the substrate. The substrate includes a back surface opposite to the front surface on which the hologram layer is provided and a side surface connecting the front surface and the back surface, and the hologram layer includes a hologram that diffracts at least some of S-polarized light among light incident on the hologram layer from outside the substrate via a portion of the side surface to generate S-polarized light toward the back surface or a side opposite to the substrate but diffracts no P-polarized light.

Also, a polarization beam splitter of the present invention includes a translucent substrate and a hologram layer provided on a front surface of the substrate. The polarization beam splitter can separate S-polarized light from light incident on the hologram layer via the substrate. The substrate includes a back surface opposite to the front surface on which the hologram layer is provided and a side surface connecting the front surface and the back surface, and the hologram of the hologram layer includes a hologram that diffracts at least some of the S-polarized light having an incident angle larger than a critical angle of the substrate with respect to air to generate S-polarized light toward the back surface or a side opposite to the substrate but diffracts no P-polarized light having an incident angle larger than the critical angle.

In the above-mentioned polarization beam splitter, the hologram of the hologram layer preferably diffracts the circularly polarized light to generate the S-polarized light having extinction ratio of 50:1 or greater. The hologram preferably transmits the P-polarized light incident via the back surface. The front surface of the substrate is a flat surface, the back surface thereof is a flat surface, and the front surface and the back surface may be disposed in parallel. At least a portion of the side surface may be inclined with respect to a normal of the front surface.

Furthermore, the above-mentioned polarization beam splitter may include a second substrate on a side of the hologram layer opposite to the substrate.

A surface light source device of the present invention includes a light source and the above-mentioned polarization beam splitter and is configured such that emission light from the light source enters the hologram layer via the portion of the side surface to emit light from the back surface of the substrate.

Also, a surface light source device of the present invention includes a light source, a translucent substrate, and a hologram layer provided on a front surface of the substrate. The substrate includes a back surface opposite to the front surface on which the hologram layer is provided, and a side surface connecting the front surface and the back surface. The surface light source device is configured such that emission light from the light source enters the hologram layer via the substrate at an incident angle larger than a critical angle of the substrate with respect to air, and the hologram layer includes a hologram for diffracting the light incident at the incident angle larger than the critical angle to generate S-polarized light having extinction ratio of 50:1 or greater toward the back surface of the substrate or a side opposite to the substrate.

Also, a surface light source device of the present invention includes a light source, a translucent substrate, and a hologram layer provided on a front surface of the substrate. The substrate includes a back surface opposite to the front surface on which the hologram layer is provided, and a side surface connecting the front surface and the back surface. The surface light source device is configured such that emission light from the light source incident from a side of the substrate at an incident angle larger than a critical angle of the substrate with respect to air, and the hologram layer includes a hologram for diffracting at least some of the S-polarized light among the light incident at the incident angle larger than the critical angle to generate S-polarized light toward the back surface of the substrate or a side opposite to the substrate but diffracts no P-polarized light.

In the above-mentioned surface light source device, the hologram of the hologram layer preferably transmits the P-polarized light incident via the back surface. It is preferable that a second hologram different from the hologram is provided on the front surface or the back surface of the substrate, and the second hologram diffracts emission light from the light source to generate light having an incident angle larger than the critical angle inside the substrate. The hologram of the hologram layer may generate divergent light or a plurality of lights with different traveling directions toward the back surface of the substrate.

Also, a display device of the present invention includes the above-mentioned surface light source device and a display element on which light emitted from the surface light source device is irradiated, or includes the above-mentioned surface light source device and a pixel electrode of a display element formed on the back surface of the substrate of the surface light source device.

In the display device, it is preferable that the display element displays an image by changing polarization state of incident light for each pixel, and it is more preferable that the display element is a reflective display element and light reflected by the display element enters the surface light source device. Also, the display device may include a polarizer having a transmission axis parallel to P-polarized light with respect to light emitted from the display element.

Effects of Invention

The polarization beam splitter of the present invention can separate S-polarized light by using the hologram in the hologram layer provided on the front surface of the substrate, the hologram interfering with at least some of S-polarized light among light incident from the portion of the side surface of the substrate to generate S-polarized light toward the back surface, or interfering with at least some of S-polarized light among light incident from the back surface of the substrate to generate S-polarized light toward the portion of the side surface. Such a polarization beam splitter can be provided by using a thin substrate, so that a thin polarization beam splitter can be provided having a thickness of about a thickness (height of side surface) of the substrate, enabling significant downsizing and weight reduction. Also, states (direction, shape, number) of light generated due to interference can be adjusted by hologram design, so that the polarization beam splitter can be applied to various uses. Other effects of the present invention will be described in the description of embodiments.

DESCRIPTION OF EMBODIMENTS

Hereinafter, embodiments of the present invention will be described with reference to the drawings. However, the present invention is not limited to the following examples.

Note that, in the present specification, P-polarized light is linearly polarized light (including a P-polarized component in circularly polarized light, elliptically polarized light, or the like) in which a vibration direction of electric vector of light incident on a boundary surface is included in an incident plane (surface including a normal of the boundary surface and a traveling direction of light), S-polarized light is linearly polarized light (including an S-polarized component in circularly polarized light, elliptically polarized light, or the like) in which the vibration direction of the electric vector of the light incident on the boundary surface is perpendicular to the incident plane, and the P-polarized light and the S polarized light are perpendicular to each other. Also, the circularly polarized light is polarized light in which a tip of an electric vector of light wave draws a circle.

[Basic Configuration of Polarization Beam Splitter]

Figure 1:
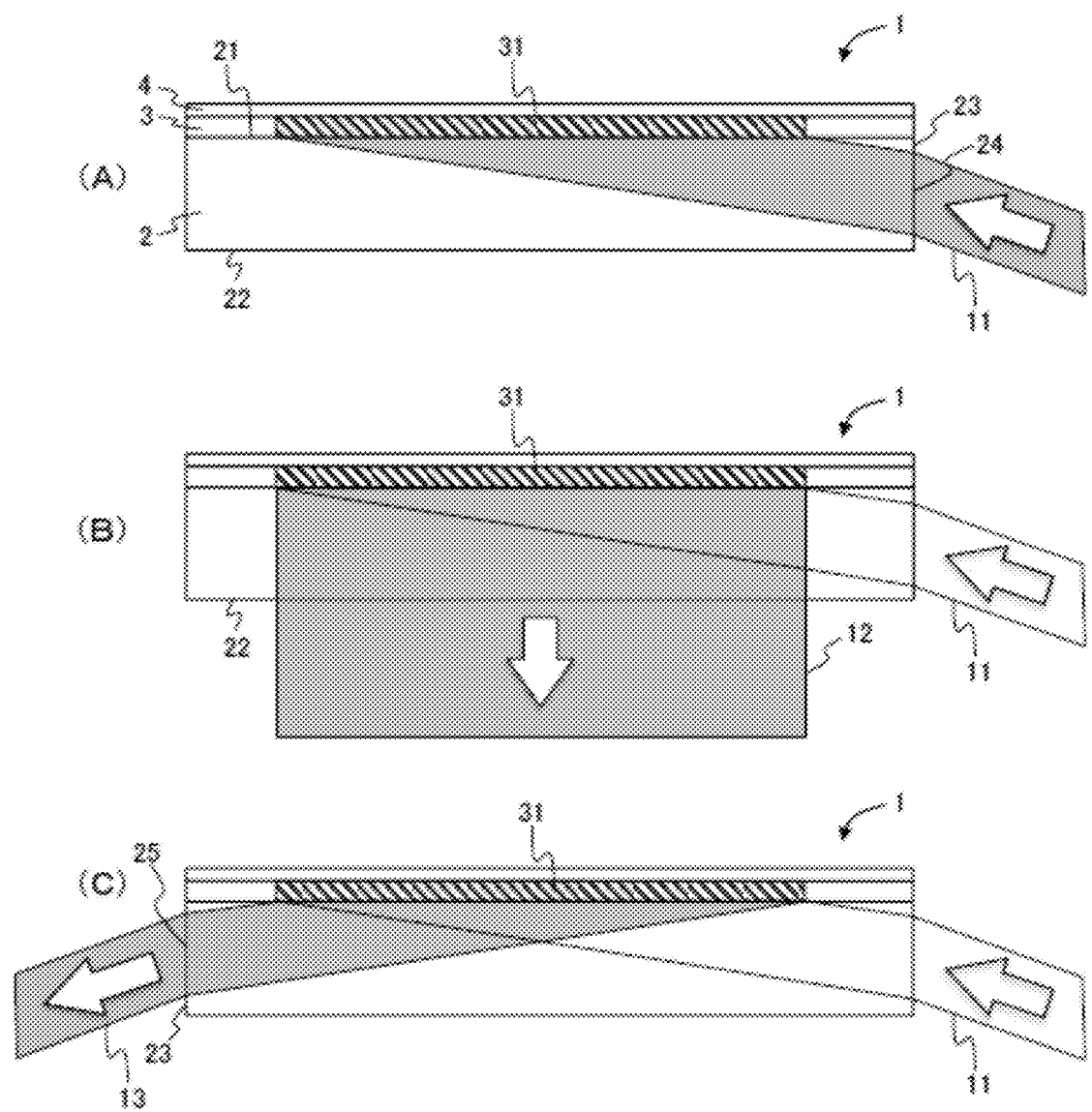
FIG. 1 is a schematic configuration diagram of a polarization beam splitter of the present invention.
Figure 2:
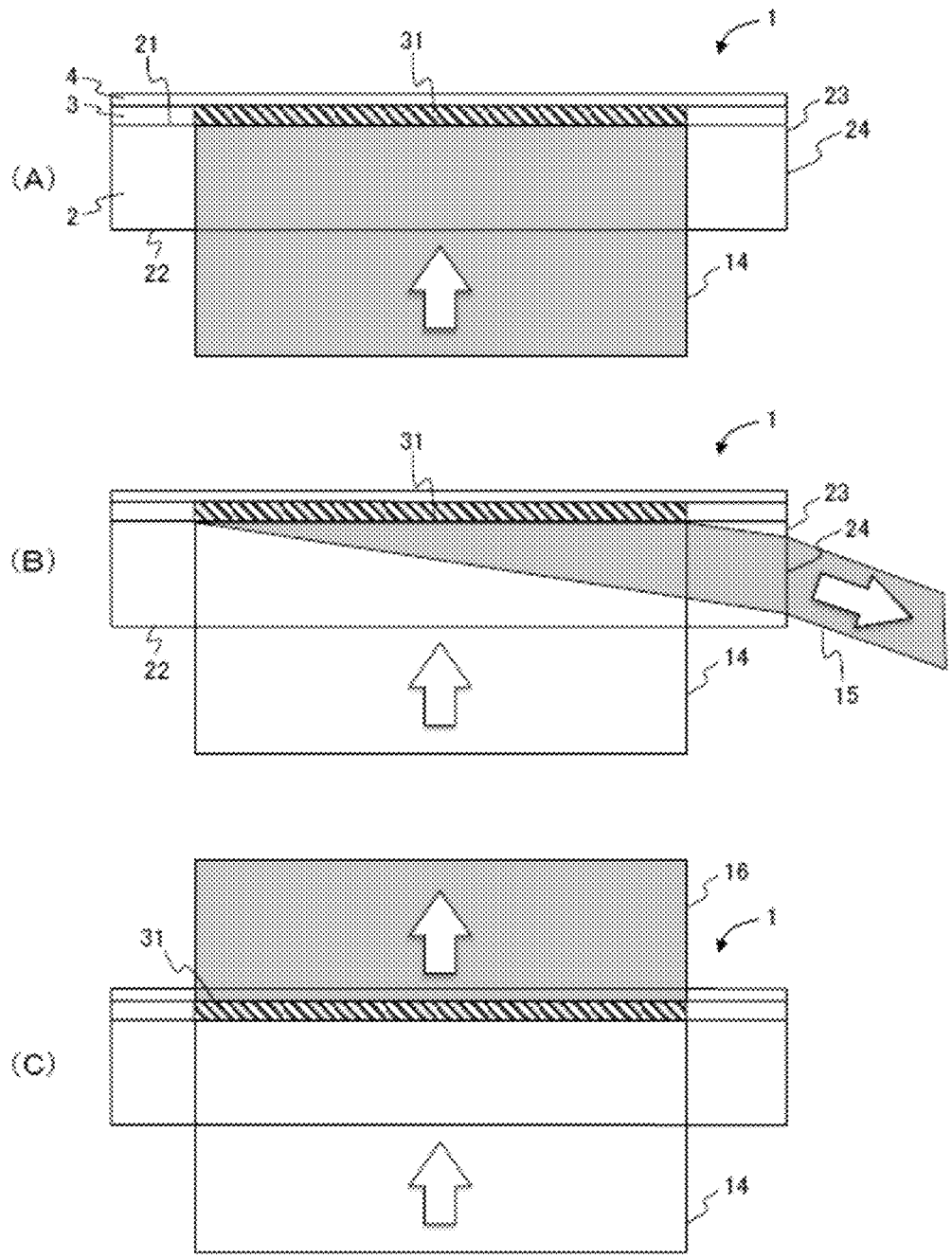
FIG. 2 is a schematic configuration diagram of the polarization beam splitter of the present invention.
Figure 12:
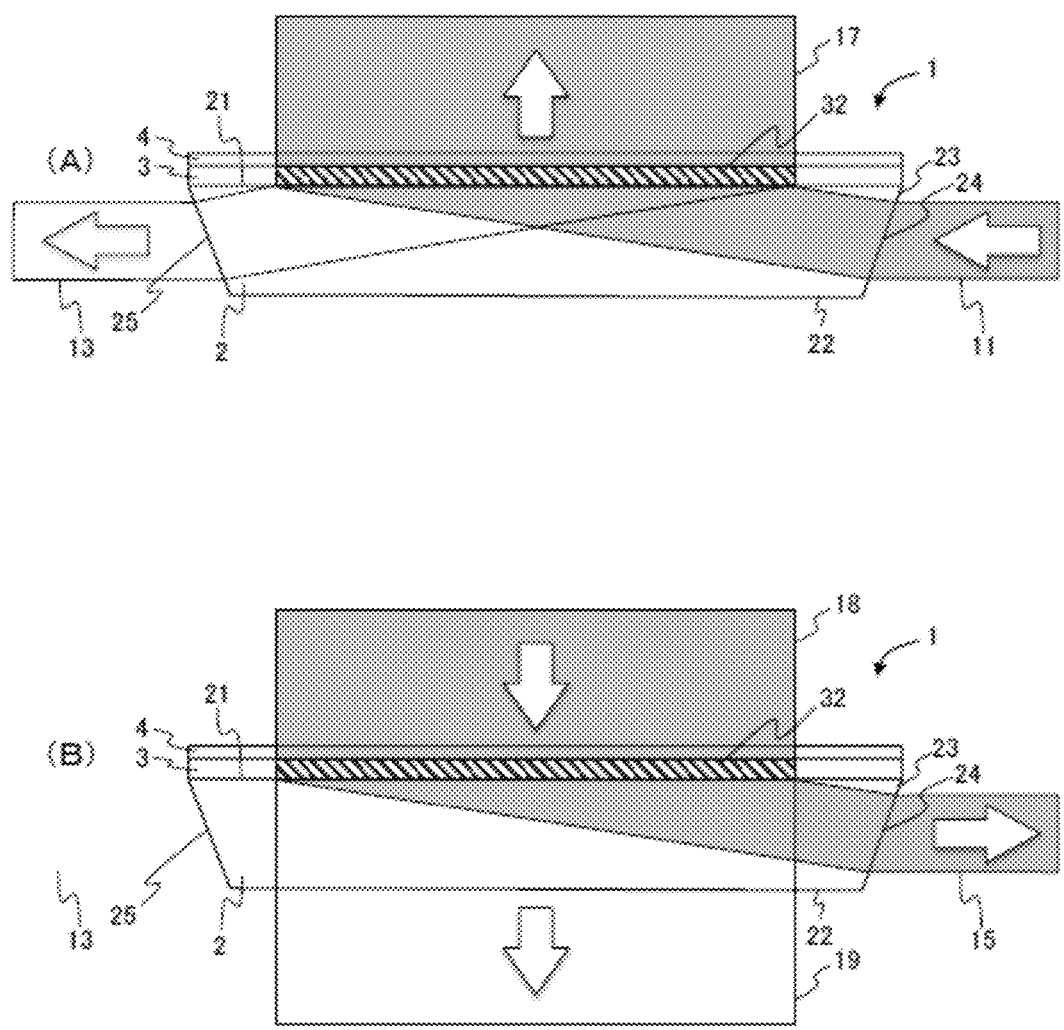
FIG. 12 is a variation of the polarization beam splitter of the present invention using the transmissive hologram.

FIG. 1 and FIG. 2 are schematic configuration diagrams of a polarization beam splitter 1 of the present invention using a reflective hologram 31. FIG. 1 shows an optical path in a case where incident light 11 is incident from a portion 24 of a side surface 23 of a substrate 2, and FIG. 2 shows an optical path in a case where incident light 14 is incident from a back surface 22 of the substrate 2. Also, FIG. 12 is a schematic configuration diagram of the polarization beam splitter 1 of the present invention using a transmissive hologram 32. FIG. 12(A) shows an optical path in a case where the incident light 11 is incident from the portion 24 of the side surface 23 of the substrate 2, and FIG. 12 (B) shows an optical path in a case where incident light 18 is incident from a side of a base film 4.

The polarization beam splitter 1 includes the translucent substrate 2 and a hologram layer 3 provided on a front surface 21 of the substrate 2, and the hologram layer 3 includes the reflective hologram 31 or the transmissive hologram 32. The polarization beam splitter 1 may have the base film 4 or a second substrate 5 (see FIG. 8(C)) on a surface of the hologram layer opposite to the substrate 2 as needed. The polarization beam splitter 1 of the present invention is a kind of holographic optical elements in a point of using a hologram of the hologram layer 3. However, the polarization beam splitter 1 is different from the conventional holographic optical elements used as deflection means or a lens that simply changes ray direction in that the former can selectively diffract and separate S-polarized light from among light incident on the hologram layer 3.

That is, the reflective hologram 31 of the present invention can interfere with at least some of the incident light 11 incident on the hologram layer 3 from outside the substrate 2 via the portion 24 of the side surface of the substrate 2 as shown in FIG. 1(A) and diffract the at least some of the incident light 11 to generate S-polarized diffracted light 12 toward the back surface 22 as shown in FIG. 1(B). Undiffracted light 13 that has not interfered with the hologram 31 is totally reflected by a surface of the polarization beam splitter 1 and emitted outside the substrate 2 from a portion 25 of another side surface as shown in FIG. 1(C). Furthermore, the reflective hologram 31 of the present invention can interfere with at least some of the incident light 14 incident on the hologram layer 3 from outside the substrate 2 via the back surface 22 of the substrate 2 as shown in FIG. 2 (A) to generate S-polarized diffracted light 15 toward the portion 24 of the side surface as shown in FIG. 2(B), and undiffracted light 16 that has not interfered with the hologram 31 passes through the hologram layer 3 and the base film 4 as it is and is emitted outside as shown in FIG. 2(C). Also, as shown in FIG. 12(A), the transmissive hologram 32 of the present invention can interfere with at least some of the incident light 11 incident on the hologram layer 3 from outside the substrate 2 via the portion 24 of the side surface of the substrate 2 and diffract at least some of the incident light 11 to generate S-polarized diffracted light 17 toward a side opposite to the substrate 2 (side of the base film 4). Undiffracted light 13 that has not interfered with the hologram 32 is totally reflected by the surface of the polarization beam splitter 1 and emitted outside the substrate 2 from the portion 25 of the other side surface. Furthermore, as shown in FIG. 12 (B), the transmissive hologram 32 of the present invention can interfere with at least some of the incident light 18 incident on the hologram layer 3 from outside the substrate 2 via the base film 4 to generate the S-polarized diffracted light 15 toward the portion 24 of the side surface. Undiffracted light 19 that has not interfered with the hologram 32 passes through the hologram layer 3 and the substrate 2 as it is and is emitted outside. The holograms 31 and 32 of the present invention diffract at least some of S-polarized light to generate S-polarized diffracted light, while they have little interference with P-polarized light to diffract no P-polarized light. The holograms 31 and 32 preferably interfere with circularly polarized incident light (S-polarized component and P-polarized component are almost 50%:50%) to generate S-polarized light having extinction ratio of 50:1 or greater.

The substrate 2 includes the front surface 21, the back surface 22 opposite to the front surface 21, and the side surface 23 connecting the front surface 21 and the back surface 22. A planar shape of the substrate 2 (shape viewed from the side of the front surface 21) shall be a shape that depends on the shape of the incident lights 11, 14, 18, and the shape of the diffracted lights 12, 15, 17 and the undiffracted lights 13, 16, 19, and typically is a square or a circle without limitation thereto. Although having translucency, the substrate 2 need not have translucency with respect to all wavelengths and is enough to have translucency with respect to at least the wavelength of light used through a holographic optical element. The material of the substrate 2 has a refractive index ($n_S$) which is larger than the refractive index of air ($n_0$=1.0) and preferably is identical or close (±0.1) to the refractive index of the hologram layer 3 ($n_H$). A translucent resin or a glass can be used as the substrate 2, and for example, acrylic resin (including polymethyl methacrylate (PMMA)), styrene resin, polyolefin resin, polycarbonate resin, epoxy resin, silicone resin, or the like may be used as the resin. These substrates typically have a refractive index ($n_S$) of about 1.3 to 1.6.

The front surface 21 of the substrate 2 is a surface on which the hologram layer 3 is provided, and may not be a flat surface although illustrated as a flat surface in the drawings. When the hologram layer 3 is provided on the front surface 21, an outer surface of the hologram layer 3 provided on the base film 4 and the front surface 21 may be pasted together by an adhesive agent, or a photosensitive material may be provided as the hologram layer 3 on the front surface 21 by coating, deposition, or the like. In FIG. 1, the hologram layer 3 is pasted on the front surface 21 such that the base film 4 becomes outside. Also, the hologram layer 3 on which a hologram has been recorded may be adhered to the front surface 21, or a hologram may be recorded in the hologram layer 3 by irradiating light through the substrate 2 after the hologram layer 3 is applied or adhered to the front surface 21.

Figure 9:
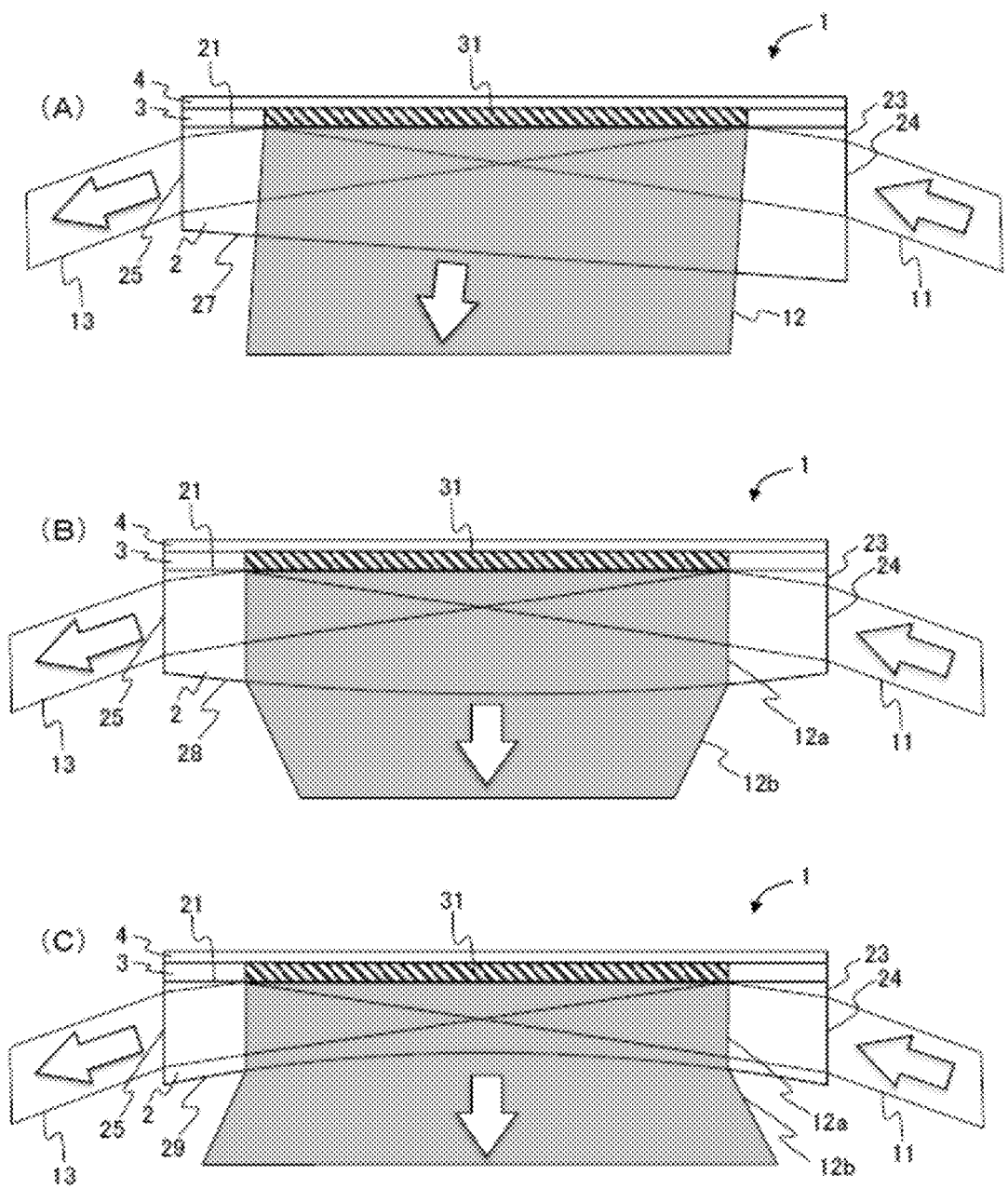
FIG. 9 is a variation of the polarization beam splitter of the present invention.

The back surface 22 is a surface opposite to the front surface 21 and becomes one of incident/emission surfaces for the incident light 14 separated by the hologram 31 of the hologram layer 3, the diffracted light 12 separated thereby, and the undiffracted light 19 transmitted through the hologram 32. When the polarization beam splitter 1 using the reflective hologram 31 is used as an illumination device such as a surface light source device, S-polarized light is typically emitted outside through the back surface 22. The back surface 22 may be a flat surface parallel to the front surface 21 as shown in FIG. 1 or may be a flat surface oblique to the front surface 21 as shown in FIG. 9(A). Also, the back surface 22 may not be a flat surface but may be a convex surface to converge the diffracted light 12 emitted as shown in FIG. 9(B), or may be a concave surface to diverge the diffracted light 12 emitted as shown in FIG. 9(C). Note that a ½ wavelength plate can disposed on the back surface 22 to emit S-polarized light outside as P-polarized light, and a ¼ wavelength plate can disposed on the back surface 22 to emit S-polarized light outside as circularly polarized light.

The side surface 23 is a surface connecting the front surface 21 and the back surface 22 of the substrate 2. Four vertical side surfaces 23 exist in a case where the substrate 2 is a rectangular parallelepiped. A height of the side surface 23 in the cross section shown in FIG. 1 corresponds to a thickness of the substrate 2. The substrate 2 and the polarization beam splitter 1 can be reduced in weight and thickness by reducing the height of the side surface 23 as compared with the length of the front surface 21 and the back surface 22 to make the whole shape into a plate shape. For example, a plate-shaped substrate having a thickness of 10 mm can be used as the substrate 2. Also, the side surface 23 may be inclined with respect to the front surface 21 or the back surface 22 (FIG. 8(A)), or may be a curved surface (FIG. 8(B)). Also, a plurality of surfaces with different inclined angles may be provided on the side surface 23.

The portion 24 of the side surface 23 is one of incident/emission surfaces for the incident light 11 separated by the hologram of the hologram layer 3 or the diffracted light 15 separated thereby. Also, as shown in FIG. 1(C) and FIG. 12(A), the portion 25 of the other side surface opposite to the portion 24 of the side surface 23 is an emission surface for emitting the undiffracted light 13 that has not interfered with the hologram of the hologram layer 3 among the light 11 incident from the portion 24 of the side surface 23. Since a refractive index ($n_S$) of the substrate 2 is larger than that of air, an incident angle of the incident light 11 incident from the portion 24 of the side surface 23 is appropriately set so that light entering the front surface 21 and the back surface 22 at an angle not less than a critical angle and propagating in a longitudinal direction of the substrate 2 by total reflection inside the substrate 2 can readily enter. Supposing that a refractive index ($n_0$) of air is 1, a critical angle $\theta_c$ of the substrate 2 with respect to air is arcsin (1/(refractive index ($n_S$) of the substrate 2)), and thus, the critical angle $\theta_c$ is about 50.3° when the refractive index ($n_S$) of the substrate 2 is 1.3, about 45.6° when the refractive index ($n_S$) of the substrate 2 is 1.4, and about 41.8° when the refractive index ($n_S$) of the substrate 2 is 1.5. When the hologram layer 3 and the base film 4 provided on the front surface 21 of the substrate 2 also have a refractive index not less than that of the substrate 2, incident light at not less than the critical angle of the substrate is totally reflected at a boundary face with air. Therefore, an optical path and the like for incident light can be designed with considering the hologram layer 3 and the base film 4 as an extension of the substrate 2. Note that, the incident surface is not limited to the portion of the side surface as long as incident light entering the hologram layer 3 at an incident angle not less than the critical angle of the substrate can be obtained inside the substrate 2 (e.g., FIGS. 14(B) and (C)). Also, light that has not interfered with the hologram of the hologram layer 3 is not limited to be emitted from the portion 25 of the other side surface 23, and other emission means may be provided. For example, undiffracted light can be emitted outside the substrate 2 by providing the second substrate on the hologram layer 3, providing in another region another hologram (e.g., hologram 104 in FIG. 14(B)) that interferes with the undiffracted light to generate diffracted light outside the substrate, or providing another hologram (e.g. hologram 105 in FIG. 14(C)) that deflects undiffracted light to have an angle smaller than the critical angle of the substrate.

The hologram layer 3 is a layer including the hologram 31 or 32, and for example, silver salt, dichromated gelatin, photopolymer, photoresist, or the like is used therefor. The base film 4 is preferably provided on one surface or both surfaces of the hologram layer 3. The base film 4 is a substrate for supporting or protecting the hologram layer 3, and a resin such as a polyethylene film, a polypropylene film, and a polyfluoroethylene film is used therefor. When a photopolymer is used as the hologram layer 3, for example, the hologram layer 3 is formed of: a monomer for recording interference fringes; a matrix for keeping shape; and a non-reactive component and various additives added as needed. Among them, the matrix is a component for keeping the shape of the hologram layer. It must have high light beam transmittance and transparency and preferably has a refractive index slightly lower than that of the monomer to facilitate refractive index modulation. An urethane resin or an epoxy resin is typically used for the matrix. In contrast, the monomer is a component for recording interference fringes. It must have high light beam transmittance and transparency and preferably has a refractive index slightly higher than that of the matrix. It records interference fringes by light irradiation. Examples of the monomer mainly include a photocationic polymerization system and a photo-radical polymerization system. An alicyclic epoxy compound such as a silicone-based epoxy is used for the photocationic polymerization system, and a vinyl compound such as vinyl carbazole, styrene derivative, acrylate, and their prepolymer is used for the photo-radical polymerization system. In the polarization beam splitter 1, the hologram layer 3 supported by the base film 4 may be adhered to the substrate 2, or the hologram layer 3 and the base film 4 may be provided on the substrate 2 by coating, deposition, or the like.

The incident lights 11, 14, 18 shall be lights that are diffracted due to interference with the hologram 31 or 32 (e.g., light satisfying Bragg diffraction conditions with interference fringes of the hologram). Typically, light in the same traveling direction as any one of two light fluxes used for recording the hologram 31 or 32, or light having a conjugate relationship with the one light flux, and having the same wavelength as that of the one light flux can be used as the incident lights 11, 14, and 18. And light in the same traveling direction as the other one of the two light fluxes, or light having a conjugate relationship with the other light flux is generated as the diffracted lights 12, 15, and 19. The incident light 11 is light traveling in the same direction as a first light flux 44 used for recording in FIGS. 3(A) and (B). The incident light 14 is light having a conjugate relationship with and an opposite traveling direction to a second light flux 45 used for recording in FIG. 3(A). The incident light 18 is light having a conjugate relationship with and an opposite traveling direction to the second light flux 45 used for recording in FIG. 3(B). States of the incident lights 11, 14, and 18 interfering with the hologram 31 or 32 as well as states of the diffracted lights 12, 15, and 19 generated by interference with the hologram 31 or 32 can be controlled by the states of the first light flux 44 and the second light flux 45 in recording. The states of light include wavelength, traveling direction, shape, and the like.

[Manufacturing Method of Polarization Beam Splitter]

FIG. 3(A) is a schematic diagram illustrating a manufacturing method of the reflective hologram 31 of the present invention, and FIG. 3(B) is a schematic diagram illustrating a manufacturing method of the transmissive hologram 32 of the present invention. The hologram layer 3 provided on the base film 4 is sandwiched between a first optical element 41 for recording and a second optical element 42 for recording. Surfaces of the hologram layer 3 and the first optical element 41 for recording are adhered without a gap, but the base film 4 and the second optical element 42 for recording are only adjacently disposed. Therefore, immersion liquid 43 having substantially the same refractive index as the refractive indices of the base film 4 and the second optical element 42 for recording is interposed therebetween to prevent formation of an air layer in a gap. Then, by inclining the first optical element 41 for recording, the second optical element 42 for recording, and the components therebetween by angle α for arrangement, and emitting the first light flux 44 and the second light flux 45 whose optical axes are perpendicular to each other so as to intersect in the hologram layer 3, interference between the first light flux 44 and the second light flux 45 can be created in the hologram layer 3 to record the hologram 31 or 32. FIG. 3(A) and FIG. 3(B) differ in that the traveling direction of the second light flux 45 is inverted. The immersion liquid 43 preferably has the same refractive index as that of the hologram layer 3, but any refractive index may be allowed as long as a refraction due to the difference between their refractive indices is within an acceptable range. Note that, FIGS. 3(A) and (B) are schematic diagrams, and although no refraction of light in the optical elements is shown in the drawings, the first light flux 44 and the second light flux 45 are incident at an incident angle α so that the optical axes of the first light flux 44 and the second light flux 45 are perpendicular to each other in the hologram layer 3 even when they are refracted.

The first optical element 41 for recording and the second optical element 42 for recording are members for introducing/leading the first light flux 44 and the second light flux 45 into/from the hologram layer 3 and have translucency to at least the first light flux 44 and the second light flux 45. The first optical element 41 for recording and the second optical element 42 for recording have a refractive index ($n_S$) which is larger than a refractive index of air ($n_0$=1.0) and preferably is identical or close (±0.1) to the refractive index of the hologram layer 3 ($n_H$). A translucent resin or a glass can be used as the first optical element 41 for recording and the second optical element 42. For example, an acrylic resin (including polymethyl methacrylate (PMMA)), a styrene resin, a polyolefin resin, a polycarbonate resin, an epoxy resin, a silicone resin, or the like may be used as the resin. These substrates typically have a refractive index ($n_S$) of about 1.3 to 1.6.

When being adhered to the hologram layer 3, the first optical element 41 for recording can be used as a substrate of a holographic optical element as it is, and for example, can be used as the substrate 2 of the polarization beam splitter 1. When the first optical element 41 for recording and the hologram layer 3 are adjacently arranged without adhesion, a base film 4 supporting the hologram layer 3 in which a predetermined hologram is recorded can be obtained, and a holographic optical element (e.g., polarization beam splitter) can be manufactured by adhering the base film 4 to another translucent substrate. When the first optical element 41 for recording and the hologram layer 3 are adjacently arranged, it is preferable to provide the base film 4 on both surfaces of the hologram layer 3 and immersion liquid having substantially the same refractive index is interposed between the hologram layer 3 and the base films 4 to prevent formation of an air layer therebetween (see FIG. 6(B)). Also, the second optical element 42 for recording may be adhered to the base film 4, or no base film 4 may be provided to make the hologram layer 3 adjacent directly or adhered to the second optical element 42 for recording.

Figure 3:
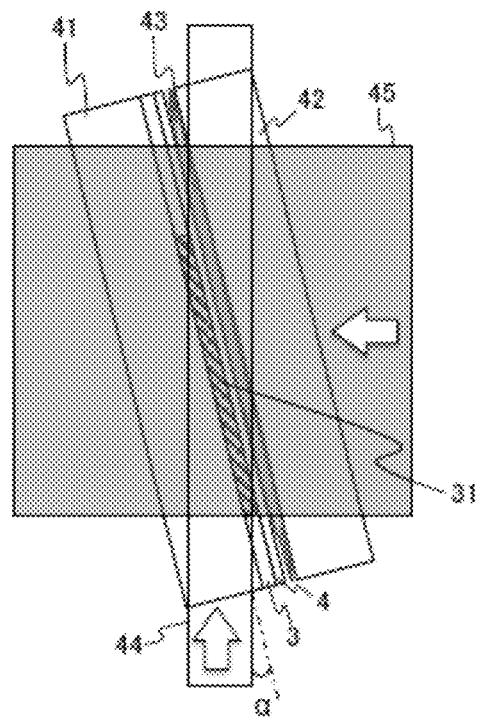
FIG. 3 is a schematic diagram illustrating a manufacturing method of (A) a reflective hologram of the present invention and (B) a transmissive hologram of the present invention.
Figure 3:
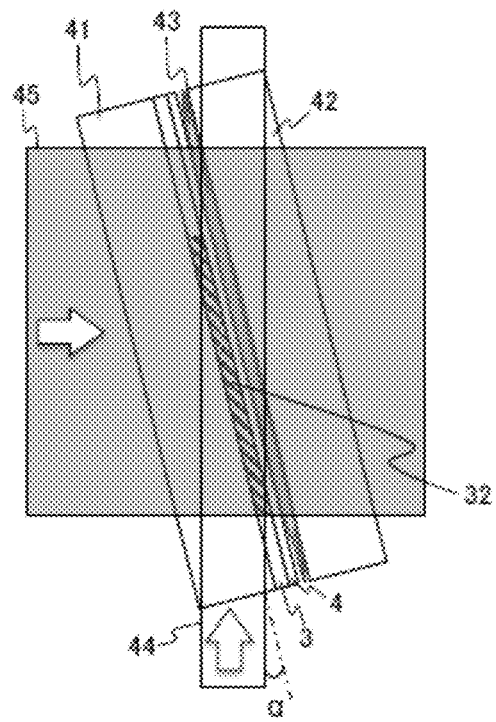

Also, the first optical element 41 for recording and the second optical element 42 for recording may be a rectangular parallelepiped as shown in FIG. 3, or some of their surfaces may be made inclined, or some of their surfaces may be a curved surface. In manufacture, a plate glass or the like can be used as it is as a rectangular parallelepiped optical element (substrate), for example. That is, a general-purpose product can be used as the substrate, which is advantageous for mass production and cost reduction. Also, for example, an incident surface for the first light flux 44 of the first optical element 41 for recording may be made inclined to make an optical path of the first light flux 44 and an optical path of the second light flux 45 intersected at an angle other than 90° (FIG. 7(A)), or a plurality of convex surfaces may be arrayed in a matrix on an incident surface for the second light flux 45 of the second optical element 42 for recording to add a fly-eye lens function to emit divergent light coming from a plurality of point light sources on the hologram layer 3 as the second light flux 45 (see FIG. 7(B)). Also, an optical element such as a prism or a lens may be separately arranged without changing the surface shape of the first optical element 41 for recording or the second optical element 42 for recording to form the first and second light fluxes to have a predetermined state (FIG. 10(C)).

The first light flux 44 is light including an S-polarized component and preferably enters the hologram layer 3 from a side surface of the first optical element 41 for recording at an incident angle not less than a critical angle of the first optical element 41 for recording with respect to air. The first light flux 44 corresponds to the incident light 11 during reproduction (FIG. 1), and has a conjugate relation with the diffracted light 15 generated when the incident light 14 (FIG. 2) or the incident light 18 (FIG. 12(B)) is incident. The second light flux 45 is light including an S-polarized component. In FIG. 3(A), the second light flux 45 enters a back surface side of the second optical element 42 for recording and then a surface of the hologram layer 3 opposite to the surface which the first light flux 44 enters so as to record the reflective hologram 31 in the hologram layer 3. Also, in FIG. 3(B), the second light flux 45 enters a back surface side of the first optical element 41 for recording and then the same surface of the hologram layer 3 which the first light flux 44 enters so as to record the transmissive hologram 32 in the hologram layer 3. The second light flux 45 corresponds to the diffracted light 12 (FIG. 1) emitted from the back surface of the substrate during reproduction or the diffracted light 17 (FIG. 12(A)) generated on the opposite side of the substrate 2 and has a conjugate relation with the incident light 14 (FIG. 2) or the incident light 18 (FIG. 12(B)). An emission direction of the diffracted light 12 or 17 during reproduction can be changed by changing the incident angle of the second light flux 45. In FIGS. 3(A) and (B), the first light flux 44 and the second light flux 45 are orthogonal to each other, but the direction of the second light flux 45 may be changed so as to make the intersection angle other than 90° (FIG. 6(A)). As to the hologram of the present invention, the intersection angle between the first light flux 44 and the second light flux 45 in the hologram layer 3 is preferably close to 90°, and especially preferably in a range of 70° to 90°. Although the first light flux 44 and the second light flux 45 are parallel light in FIG. 3, they are not limited thereto and may be divergent light (FIG. 10(C)) or convergent light. The shape (cross-sectional pattern parallel to an optical axis and cross-sectional pattern perpendicular to the optical axis) of the second light flux 45 can be changed so as to change the shape of the diffracted light 12 or 17 during reproduction into the same shape as the shape of the second light flux 45. Also, a hologram may be multiply recorded in the hologram layer 3 by sequentially or simultaneously using a plurality of light fluxes with different traveling directions or/and wavelengths as the second light flux 45 (FIG. 11(B)).

Although a manufacturing method of the reflective hologram 31 is exemplified in FIG. 6, FIG. 7, FIG. 10(C), or FIG. 11(B), the transmissive hologram 32 can be recorded in the hologram layer 3 by inverting the traveling direction of any one of the first light flux 44 and the second light flux 45 to make both the first light flux 44 and the second light flux 45 emitted from the same surface side of the hologram layer 3.

[Measuring Method of Polarized Component]

Figure 4:
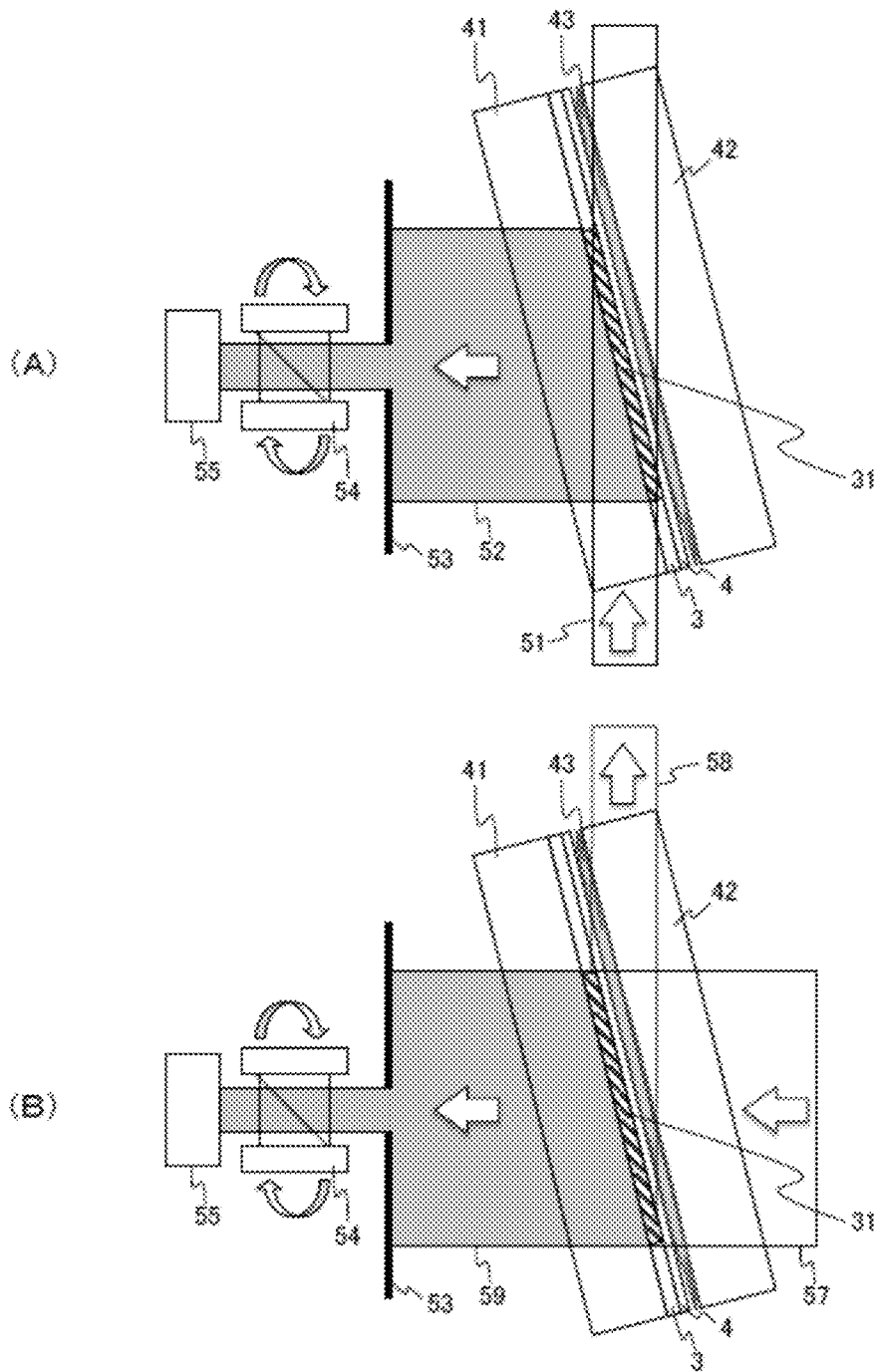
FIG. 4 is a schematic diagram illustrating a measuring method of a polarized component of (A) diffracted light or (B) undiffracted light of the hologram.

FIG. 4(A) is a schematic diagram illustrating an example of a measuring method of a polarized component of diffracted light 52 of the hologram 31, and FIG. 4(B) is a schematic diagram illustrating an example of a measuring method of a polarized component of undiffracted light (transmitted light) 59 of the hologram 31. In FIG. 4(A), a light flux 51 for reproduction to interfere with the hologram 31 is emitted to the hologram 31 via the side surface of the first optical element 41 for recording at the same angle as that of the first light flux 44, and some of the diffracted light 52 generated from the hologram 31 is taken out by an aperture (opening) 53 to detect quantity thereof by a detector 55 when it passes through a high performance analyzer 54 such as a Glan-Thompson prism. Also, in FIG. 4(B), a light flux 57 for reproduction to interfere with the hologram 31 is emitted to the hologram 31 via the back surface of the second optical element 42 for recording at the same angle as that of the second light flux 45, and some of the undiffracted light (transmitted light) 59 transmitted through the hologram 31 is taken out by the aperture (opening) 53 to detect quantity thereof by the detector 55 when it passes through the high performance analyzer 54 such as a Glan-Thompson prism. A P-polarized component and an S-polarized component of diffracted light or undiffracted light can be measured by rotating the transmission axis of the analyzer 54 by 90° from a direction parallel to P-polarized light to a direction parallel to S-polarized light while measuring light quantity by the detector 55. A ratio of the S-polarized component and the P-polarized component is called extinction ratio, which can be calculated from light quantity of the S-polarized component and light quantity of the P-polarized component detected by the detector 55.

In FIGS. 4(A) and (B), the light flux 51 for reproduction is emitted onto the side surface of the first optical element 41 for recording at the same angle and the same position as those of the first light flux 44 in a state where the hologram 31 is supported by the base film 4 and adhered to the first optical element 41 for recording, and where the second optical element 42 for recording and the base film 4 are adjacent to each other via the immersion liquid 43. Emitting the light flux 51 for reproduction in the same state as that of the first light flux 44 in this manner makes it possible to improve diffraction efficiency. Also, since the light flux 51 for reproduction that has not interfered can be transmitted through the hologram layer 3 by the second optical element 42 for recording and emitted via the second optical element 42 for recording, noise due to the light flux 51 for reproduction can be reduced. Furthermore, since a light flux 58 of diffracted light generated by the light flux 57 for reproduction can be emitted from the hologram layer 3 by the second optical element 42 for recording via the second optical element 42 for recording, noise due to the light flux 51 for reproduction can be reduced. Note that, when a polarized component is measured for the transmissive hologram 32, it is sufficient to determine an arrangement such that diffracted light from the hologram 32 enters the detector 55 and the hologram 32 is irradiated with light flux for reproduction so as to measure diffracted light and transmitted light in the same manner. FIGS. 4(A) and (B) are schematic diagrams, and any arrangement may be employed as long as diffracted light and transmitted light enter the detector 55, and various optical systems (lens, mirror, prism, and the like) may be arranged on the way.

[Verification Experiment of Reflective Hologram]

Figure 5:
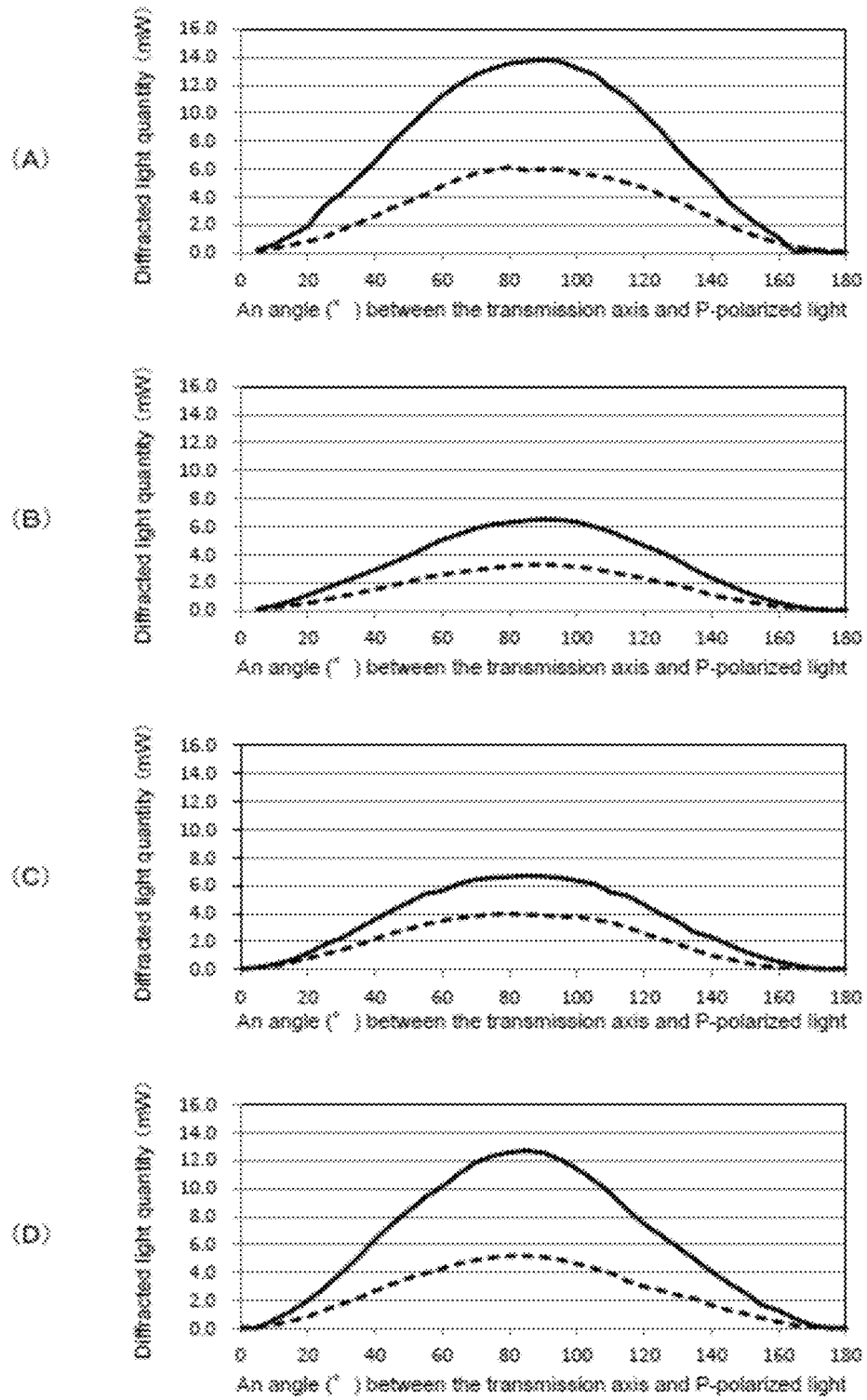
FIGS. 5(A) to (D) are measurement results of diffracted light quantity in Experiments 1, 3, 7, and 9, respectively.

Table 1 and FIG. 5 show a result of a verification experiment for manufacturing conditions to serve as the hologram 31 of the present invention. In the verification experiment, in the manufacturing method in FIG. 3(A), a glass plate (length 100 mm×width 100 mm×thickness 10 mm) having a refractive index of 1.48 was used for the first optical element 41 for recording and the second optical element 42 for recording, a photopolymer having a refractive index of 1.49 supported by the base film 4 having a refractive index of 1.58 was provided as the hologram layer 3, and the immersion liquid 43 having a refractive index of 1.51 was interposed between the base film 4 and the second optical element 42 for recording. The glass plate was inclined such that an incident angle $\alpha$ of the first light flux 44 with respect to a side surface of the glass plate was 14° (an incident angle of the second light flux 45 was also 14°), and the hologram 31 was recorded for nine combinations of the first light flux 44 and the second light flux 45 in which each of the first light flux 44 and the second light flux 45 was S-polarized light, P-polarized light, or circularly polarized light. For each of the recorded holograms, quantity of the diffracted light 52 versus angle of the transmission axis of the analyzer 54 when the light flux 51 for reproduction of S-polarized light, P-polarized light, or circularly polarized light was emitted was measured in the measuring method of FIG. 4(A) with the above-mentioned arrangement so as to calculate the S-polarized component and the P-polarized component of the quantity of the diffracted light 52. Note that, the first light flux 44 and the second light flux 45 were arranged such that their optical axes intersect at 90°, and S-polarized light having extinction ratio of 100:1 was formed from light emitted from a 532 nm solid state laser as the light flux used for recording and reproduction, and in cases of P polarized light and circularly polarized light, the S-polarized light was converted into P-polarized light and circularly polarized light by wavelength plates. Also, the quantity of the light flux 51 for reproduction was about 19 mW when calculated by converting it into an area ratio of light received by the detector 55.

"Polarization during recording" of Table 1 shows condition of the first light flux 44 and the second light flux 45 during recording in Experiments 1 to 9, and for example, recording was performed using S-polarized first light flux 44 and S-polarized second light flux 45 in Experiment 1. "Polarization for reproduction" of Table 1 shows the maximum value of diffracted light quantity and a numerical value of the extinction ratio of the diffracted light 52 generated when the light flux 51 for reproduction of S-polarized light, P-polarized light, or circularly polarized light is emitted onto the hologram in each experiment. The unit of the diffracted light quantity is mW. The extinction ratio is a ratio between the S-polarized component and the P-polarized component and is a numerical value with setting the P-polarized component to be 1. "-" in the table indicates that the maximum value of the light quantity detected is not more than 1/100 of the quantity of the light flux (emission light) for reproduction to reproduce a hologram and thus evaluated such that substantially no diffraction has occurred. Note that, the measurement was performed with setting noise level under the measurement environment to not more than 1/10000 by preparing a dark room environment such that the noise level becomes sufficiently lower than the quantity of the light flux for reproduction (emission light). When the extinction ratio is calculated, the calculation is made using a numerical value as it is even when the minimum value is a light quantity of not more than 1/100 of the emission light.

TABLE 1

| Experi-ment | Polarization during recording | | Polarization during reproduction | | | | | |
|---|---|---|---|---|---|---|---|---|
| | Light flux 1 | Light flux 2 | S | | P | | Circle | |
| | | | DLQ | ER | DLQ | ER | DLQ | ER |
| 1 | S | S | 13.8 | 445:1 | — | — | 6.1 | 58:1 |
| 2 | S | P | — | — | — | — | — | — |
| 3 | S | circle | 6.5 | 310:1 | — | — | 3.3 | 63:1 |
| 4 | P | S | — | — | — | — | — | — |
| 5 | P | P | — | — | — | — | — | — |
| 6 | P | circle | — | — | — | — | — | — |
| 7 | circle | S | 6.7 | 319:1 | — | — | 4.0 | 70:1 |
| 8 | circle | P | — | — | — | — | — | — |
| 9 | circle | circle | 12.7 | 373:1 | — | — | 5.2 | 115:1 |

DLQ: Diffracted Light Quantity,
ER: Extinction Ratio

Table 1 shows that diffracted light was detected when S-polarized light flux for reproduction or circularly polarized light flux for reproduction was emitted onto the hologram recorded under conditions of Experiments 1, 3, 7, and 9. FIGS. 5(A) to (D) show measurement results of quantity of the diffracted light 52 versus angle of the transmission axis of the analyzer 54 in Experiments 1, 3, 7, and 9, respectively. A vertical axis represents diffracted light quantity (mW), and a horizontal axis represents an angle)(° between the transmission angle of the analyzer 54 and P-polarized light. The diffracted light quantity was detected at each angle on the way of rotation from a direction parallel to P-polarized light (0°) to 180°. Also, a solid line represents a result in a case where S-polarized light flux for reproduction was emitted, and a dotted line represents a result in a case where circularly polarized light flux for reproduction was emitted. These results show that the hologram 31 according to the present invention could not be formed when P-polarized light flux was used for recording. Since circularly polarized light has an S-polarized component and a P-polarized component of about 1:1, the hologram 31 according to the present invention is predicted to need the S-polarized component in both the first light flux 44 and the second light flux 45 during recording. Furthermore, also during reproduction, diffracted light could not be obtained even when P-polarized light flux was emitted. Therefore, the light flux 51 for reproduction is predicted to need the S-polarized component also during reproduction. Any of the diffracted light 52 generated was S-polarized light having extinction ratio of 50:1 or greater. The extinction ratio is obtained using a ratio between the maximum light quantity and the minimum light quantity in each graph of FIG. 5 and the extinction ratio takes the maximum value near 90° (S-polarized light), and takes the minimum value near 0° or 180° (P-polarized light) in every graph.

For the S-polarized light and the hologram recorded by S-polarized light in Experiment 1, the maximum value of the quantity of the diffracted light 52 and diffraction efficiency when the S-polarized light flux 51 for reproduction (about 19 mW) was emitted were 13.8 mW and about 73%, respectively, and the maximum value of the quantity of the diffracted light 52 and diffraction efficiency when the circularly polarized light flux 51 for reproduction was emitted were 6.1 mW and about 32%, respectively. Also, for the hologram of Experiment 1, the extinction ratio with respect to S-polarized light having extinction ratio of 100:1 was 445:1, and the extinction ratio with respect to circularly polarized light was 58:1. The hologram of Experiment 1 can be used as a polarization beam splitter that separates S-polarized diffracted light (58:1) of 32 mW into another optical path and transmits undiffracted light of 68 mW as it is when circularly polarized light (S:P=50:50) of 100 mW is incident as a light flux for reproduction. Furthermore, the hologram of Experiment 1 can be used as a polarization beam splitter that interferes with some of incident S-polarized light of 100 mW (extinction ratio 100:1) to separate S-polarized diffracted light of 73 mW (extinction ratio 445:1) into another optical path, and that transmits incident P-polarized light as it is.

The holograms of Experiments 3 and 7 were recorded by combining S-polarized light and circularly polarized light during recording and exhibited substantially comparable characteristics. However, their diffraction efficiencies are about half of that of the hologram of Experiment 1. However, for diffracted light, Experiments 3 and 7 exhibited the extinction ratio of 300 or greater with respect to S-polarized light having extinction ratio of 100:1, and the extinction ratio of 63:1 and 70:1, respectively, with respect to circularly polarized light, which means that S-polarized light having high extinction ratio can be separated from circularly polarized light.

The hologram of Experiment 9 was recorded using two circularly polarized lights, and the maximum value of the quantity of the diffracted light 52 and diffraction efficiency when the S-polarized light flux 51 for reproduction (about 19 mW) was emitted were 12.7 mW and about 67%, respectively, and the maximum value of the quantity of the diffracted light 52 and diffraction efficiency when the circularly polarized light flux 51 for reproduction was irradiated were 5.2 mW and about 27%, respectively. Therefore, the hologram of Experiment 9 is sufficiently available as a polarization beam splitter although the diffraction efficiency is slightly lower than that of the hologram of Experiment 1.

Also, the quantity of undiffracted light 59 when the light flux 57 for reproduction was emitted to the similar hologram 31 was measured by the measuring method of FIG. 4(B), and it was confirmed that P-polarized light did not interfere with the hologram 31 and was transmitted through the hologram 31. Also, at least some of S-polarized light interferes with the hologram 31 to generate diffracted light, but the rest of the S-polarized light that do not interfere with the hologram 31 is transmitted therethrough.

[Variations of Manufacturing Method of Polarization Beam Splitter]

Figure 6:
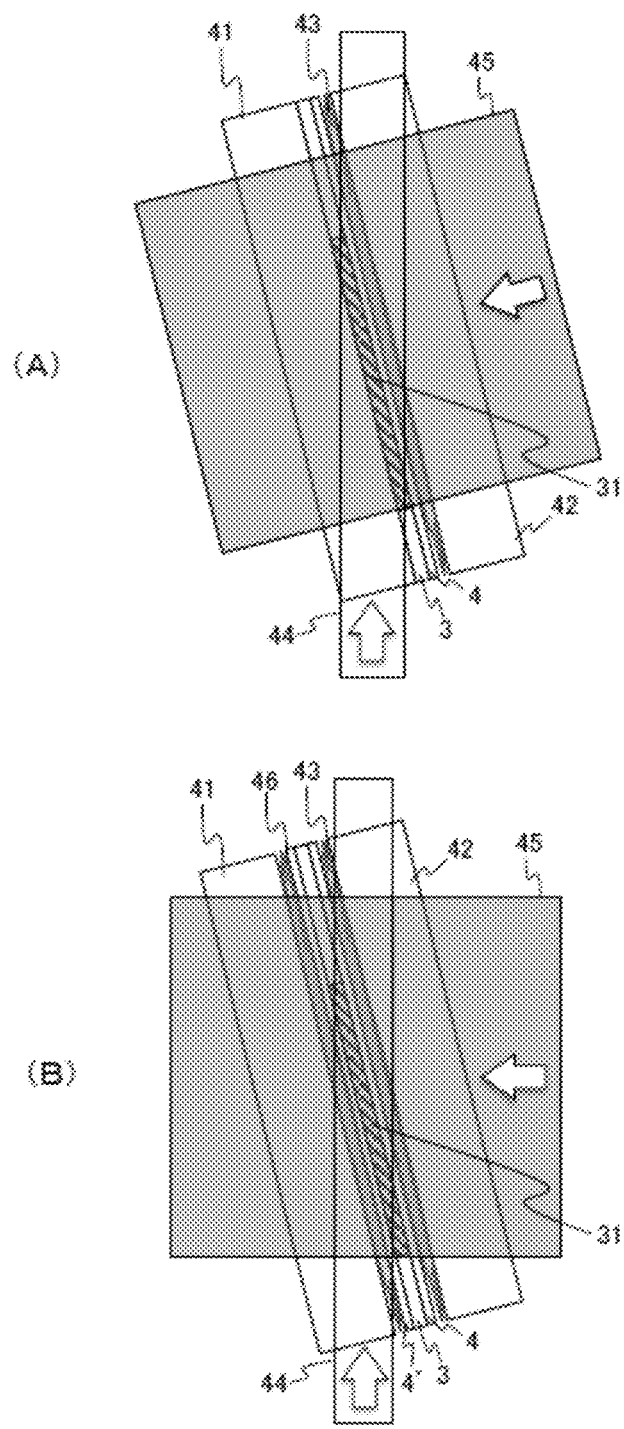
FIG. 6 is a diagram illustrating another manufacturing method of a hologram of the present invention.
Figure 7:
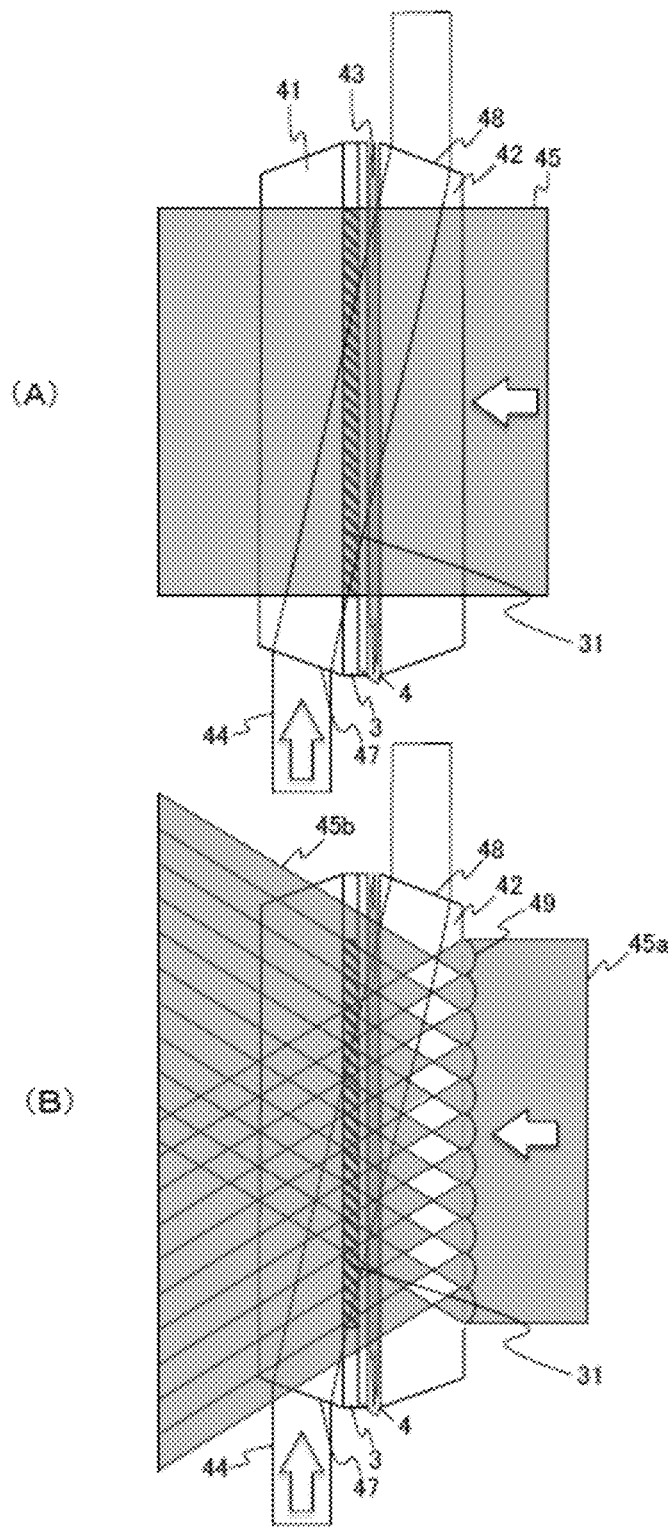
FIG. 7 is a diagram illustrating another manufacturing method of the hologram of the present invention.

FIGS. 6 and 7 are diagrams illustrating other manufacturing methods of the hologram of the present invention.

FIG. 6(A) shows an example in which the second light flux 45 is vertically emitted onto the hologram layer 3 and the surface of the first and second optical elements 41, 42. This example can be provided by deflecting the traveling direction of the second light flux 45 in FIG. 3(A). The hologram recorded by the manufacturing method of FIG. 6(A) generates the diffracted light 12 perpendicular to the back surface 22 for the incident light 11 obliquely incident from the portion 24 of the side surface as shown in FIGS. 1 and 2.

In FIG. 6(B), the hologram layer 3 and base films 4, 4' provided on both surfaces thereof was made to be independent members, a gap between the hologram layer 3 and the first optical element 41 for recording was also filled with the immersion liquid 46, and the hologram 31 was recorded by emitting the first and second light fluxes. In FIG. 6(B), the optical axes are arranged like in FIG. 3(A), but their arrangement is not specifically limited thereto and other arrangements may be employed. According to the manufacturing method of FIG. 6(B), the base films 4, 4' having the hologram layer 3 in which the predetermined hologram 31 is recorded can be obtained. This allows the hologram layer 3 to be independent so that by attaching the hologram layer 3 which has been exposed for recording the hologram 31 onto the translucent substrate 2, the attached region can serve as a polarization beam splitter. This makes it possible to improve design flexibility of shape, arrangement, and the like of the substrate 2. Also, a portion of the hologram layer 3 is exposed to record the hologram 31, and then another region of the hologram layer 3 can be also exposed by moving the hologram layer 3. This makes it possible to form the hologram 31 having a large area without limitation by the size of the substrate 2. Note that, when being attached to the substrate 2, the hologram layer 3 may be adhered to the substrate 2 after one of the base films is peeled off, or any one of the base films may be adhered to the substrate 2.

FIG. 7(A) is configured such that side surfaces 47, 48 of the first optical element 41 for recording and the second optical element 42 for recording are inclined surfaces, the optical axis of the first light flux 44 in air is arranged in parallel to the hologram layer 3, and when the first light flux 44 enters the inclined surface of the first optical element 41 for recording, the first light flux 44 is refracted and obliquely passes through the first optical element 41 for recording and then the hologram layer 3 so as to interfere with the second light flux 45. For the hologram 31, diffracted light is generated perpendicularly from the hologram layer 3 by the incident light parallel to the hologram layer 3, and the diffracted light is emitted perpendicularly from the back surface of the substrate, so that this embodiment can be used as an optical system for a polarization beam splitter that separates the S-polarized component of incident light into the perpendicular direction. Note that the side surface 48 of the second optical element 42 for recording is not necessarily an inclined surface. Also, the hologram 31 that generates diffracted light perpendicularly from the hologram layer 3 when light is incident parallel to the hologram layer 3 can also be manufactured by removing the second optical element 42 for recording and emitting the above-mentioned first light flux 44 and second light flux 45.

FIG. 7(B) is configured such that a plurality of convex surfaces 49 is arrayed in a matrix on an incident surface for the second light flux 45 of the second optical element 42 for recording so as to add a fly-eye lens function by which a parallel second light flux 45a is converged to focal points in front of the hologram layer 3 by respective convex surfaces 49 and thereafter emitted as divergent light 45b onto the hologram layer 3. Accordingly, for the hologram 31 of the hologram layer 3, interference fringes are formed by the first light flux 44 and the divergent light 45b from a plurality of point light sources (the focal points), and light similar to the divergent light 45b is generated as diffracted light by a light flux on the same optical path as that for the first light flux 44 during reproduction and emitted from back surface or the like of the substrate. Using such divergent light as a light source of a display device makes it possible to increase a viewing angle of the display device. Such divergent light can also be used to uniformize brightness distribution of incident light for illumination corresponding to the first light flux 44 during reproduction.

In the above-mentioned variations of the manufacturing method, each of the changes is interchangeable. For example, the manufacturing method of FIGS. 6(A) and (B) can be combined with that of FIG. 7(B) so that the plurality of convex surfaces 49 are arrayed in a matrix on the incident surface for the second light flux 45 so as to add a fly-eye lens function, or the manufacturing method of FIGS. 7(A) and (B) can be combined with that of FIG. 6(B) so that a gap between the hologram layer 3 and the first optical element 41 for recording is also filled with the immersion liquid 46. Furthermore, a plurality of convex surfaces or concave surfaces may be arranged in a matrix on the incident surface 47 for the first light flux 44.

[Variations of Polarization Beam Splitter]

Figure 8:
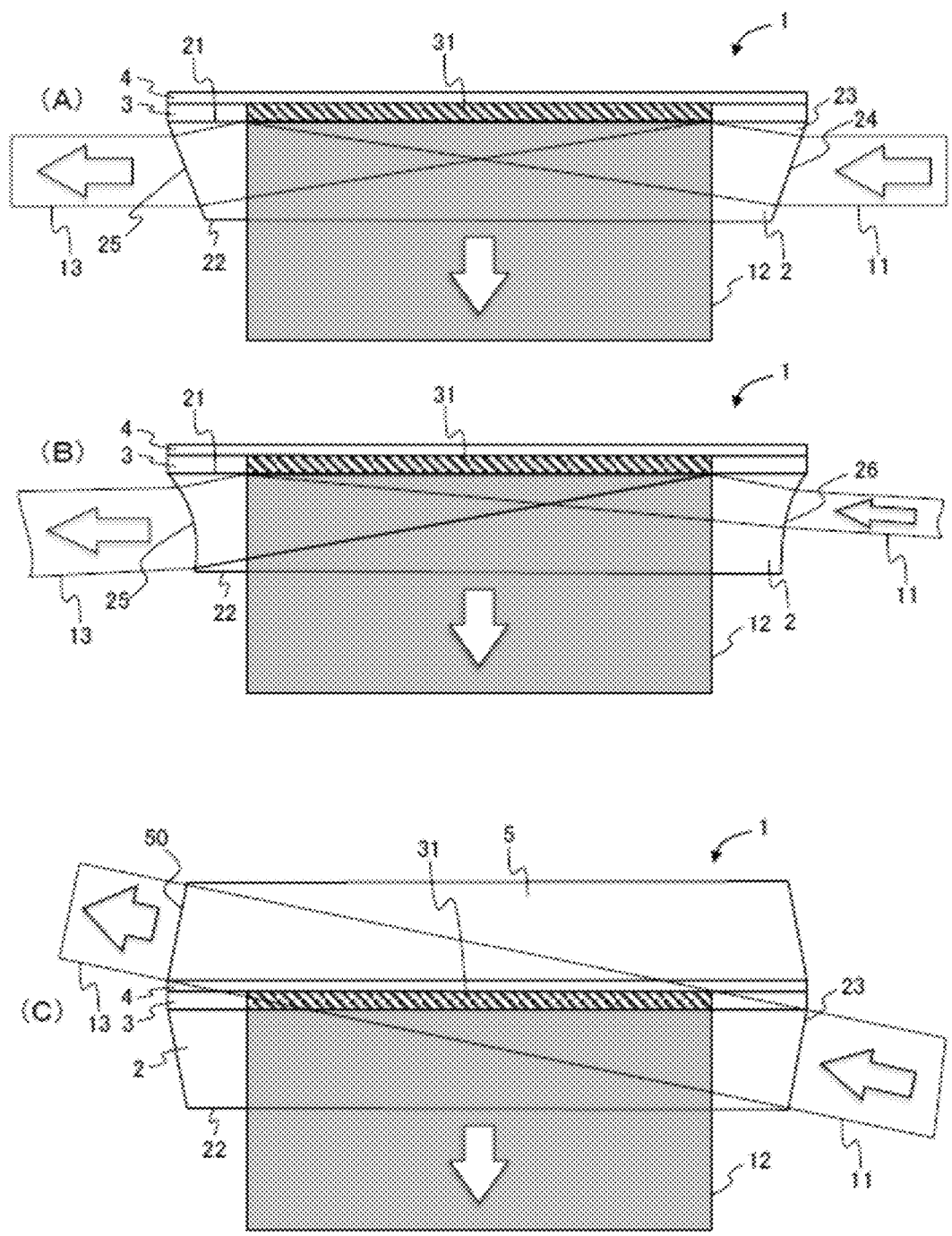
FIG. 8 is a variation of the polarization beam splitter of the present invention.

FIG. 8(A) shows a variation of the polarization beam splitter 1, which can be manufactured by, for example, the manufacturing method of FIG. 7(A), or by a manufacturing method in which the second optical element 42 for recording is removed from FIG. 7(A) and the first light flux 44 and the second light flux 45 are emitted. The side surface 23 of the substrate 2 is inclined, and a cross section of the substrate 2 is a trapezoid. In the polarization beam splitter 1 of FIG. 8(A), the incident light 11 having the optical axis parallel to the hologram layer 3 enters the portion 24 of the inclined side surface 23 and is refracted by the incident surface so as to obliquely enter the hologram layer 3 at an incident angle not less than the critical angle and interfere with the hologram 31. Therefore, the S-polarized diffracted light 12 can be generated perpendicularly to the hologram layer 3 toward the back surface 22 from the hologram 31. The undiffracted light 13 that has not interfered with the hologram 31 among the incident light 11 can be totally reflected by a surface of the polarization beam splitter 1 (boundary face of the hologram layer 3 or surface of the base film 4) and refracted by the portion 25 of the inclined other side surface so that light having an optical axis parallel to the hologram layer 3 can be emitted. Also, although omitted in the drawing, for the incident light 14 from the back surface 22, the diffracted light 15 in the opposite direction to the incident light 11 of FIG. 8(A) is generated, and the undiffracted light 16 passes through the hologram layer 3 and the base film 4 and is emitted outside. The polarization beam splitter 1 of FIG. 8(A) can be used as an optical system for a polarization beam splitter that separates the S-polarized component of incident light in a direction perpendicular to the optical axis of the incident light. In addition, the optical axes of incident light and undiffracted light can be made coaxial. Therefore, arrangement, positioning, and the like can be made easy. Note that, the inclined angle of the side surface 23 and the incident angle of the incident light 11 can be set as appropriate. For example, a configuration may be employed in which the incident light 11 perpendicularly enters the inclined surface of the side surface 23, and the totally-reflected undiffracted light 13 is emitted perpendicularly from the inclined surface of the other side surface.

FIG. 8(B) shows a variation of the polarization beam splitter 1, in which the side surface inclined of FIG. 8(A) is made to be a concave surface 26. The concave surface 26 is a cylindrical lens extending in a direction perpendicular to the paper of FIG. 8(B). In the polarization beam splitter 1 of FIG. 8(B), the incident light 11 enters the concave surface 26 on a side of the substrate 2, becomes divergent light inside the substrate 2, and interferes with the hologram 31 so that the S-polarized diffracted light 12 can be generated perpendicularly to the hologram layer 3 toward the back surface 22 from the hologram 31. The undiffracted light 13 that has not interfered with the hologram 31 among the incident light 11 is totally reflected by the surface of the polarization beam splitter 1 (boundary face of the hologram layer 3 or surface of the base film 4), and refracted by the concave surface 26 of the inclined other side so that light wider than the incident light 11 can be emitted. Also, although omitted in the drawing, for the incident light 14 from the back surface 22, the diffracted light 15 in opposite direction to the incident light 11 of FIG. 8(B) is generated, and the undiffracted light 16 passes through the hologram layer 3 and the base film 4 and is emitted outside. The polarization beam splitter 1 of FIG. 8(B) can use incident light having a small diameter so as to downsize the optical system. Note that, a flat surface or a convex surface may be employed for the other side surface of the substrate 2 instead of the concave surface.

FIG. 8(C) shows a variation of the polarization beam splitter 1 which includes the base film 4 on a surface of the hologram layer opposite to the first substrate 2 and further includes the second substrate 5 on a surface of the base film 4 opposite to the hologram layer 3. The polarization beam splitter 1 of FIG. 8(C) is manufactured by the manufacturing method of FIG. 7(A) in which the base film 4 adheres to the second optical element 42 for recording without interposing the immersion liquid 43 therebetween so that it can be used as the polarization beam splitter 1 as it is. In the polarization beam splitter 1 of FIG. 8(C), the side surface 23 of the first substrate 2 is inclined. The incident light 11 is incident perpendicularly to the inclination, passes through the hologram layer 3 while keeping its optical axis, and interferes with the hologram 31. Therefore, the S-polarized diffracted light 12 can be generated perpendicularly to the hologram layer 3 from the hologram 31 toward the back surface 22 of the first substrate 2. The undiffracted light 13 that has not interfered with the hologram 31 among the incident light 11 passes through the base film 4 and the second substrate 5 and emitted perpendicularly to an inclined side surface 50 of the second substrate 5. Also, although omitted in the drawing, for the incident light 14 from the back surface 22 of the first substrate 2, the diffracted light 15 in the opposite direction to the incident light 11 of FIG. 8(C) is generated, and the undiffracted light 16 passes through the hologram layer 3, the base film 4, and the second substrate 5 and is emitted outside. The polarization beam splitter 1 of FIG. 8(C) includes the second substrate 5 so that the undiffracted light 13 passes through the hologram layer 3 and is not reflected on the side of the first substrate 2 This makes it possible to reduce noise to the diffracted light 12. Also, optical axes of the incident light 11 and the undiffracted light 13 can be made coaxial. Therefore, arrangement, positioning and the like can be made easy. Note that, the inclined angle of the side surface of the first substrate 2 and the second substrate 5 as well as the incident angle of incident light can be set as appropriate. For example, the side surfaces may be perpendicular to the hologram layer, and the overall configuration of the polarization beam splitter 1 may be such that two plate-shaped substrates sandwich the hologram layer. Also, an optical path similar to that in FIG. 7(A) may be employed.

FIGS. 9(A) to (C) show an example in which the back surface 22 of the substrate 2 of the polarization beam splitter 1 is modified. In FIG. 9(A), a back surface 27 of the substrate 2 is formed by a flat surface inclined with respect to the front surface 21, and the diffracted light 12 is obliquely generated from the hologram 31 to be perpendicular to the inclined back surface 27. When the hologram 31 of FIG. 9(A) is manufactured by, for example, the manufacturing method of FIG. 3(A), the diffracted light 12 is generated perpendicularly to the incident light 11 and obliquely to the hologram layer 3. The inclined back surface 27 of the substrate 2 of FIG. 9(A) is provided perpendicularly to the diffracted light 12 which obliquely travels as described above, so that influence of aberration or the like can be reduced. Also, the inclined back surface 27 can be inclined with respect to the diffracted light 12 so that the direction of emission light can be largely changed by using refraction by the inclined back surface 27.

In FIG. 9(B), the back surface of the substrate 2 is formed by a convex surface 28, and diffracted light 12*a* perpendicularly generated from the hologram 31 is emitted as light 12*b* converged on the convex surface 28 of the back surface. In FIG. 9(B), diffracted light can be shaped on the back surface of the substrate 2, providing various effects such as cost down, lighter weight, improved reliability, and the like due to reduction of number of parts. Note that the convex surface 28 may be a cylindrical lens extending in the direction perpendicular to the paper to converge light in one direction, or the convex surface 28 may have a shape rotated about its optical axis as a center to converge light in all directions. Note that, in the case of the cylindrical lens, a linear light source can be provided and it can be used as a light source of a line sensor of a scanner or the like. Also, when used as a surface light source device of a front light of a reflective display device (e.g., LCOS), light reflected by the display device passes through the convex surface 28 again. Therefore, the convex surface 28 can also serve as a part of a projection lens so that the display device can be more effectively designed for downsizing.

In FIG. 9(C), the back surface of the substrate 2 is formed of a concave surface 29, and the diffracted light 12*a* perpendicularly generated from the hologram 31 is emitted as light 12*b* diverging from the concave surface 29 of the back surface. In FIG. 9(C), diffracted light can be shaped by the back surface of the substrate 2, providing various effects such as cost down, lighter weight, improved reliability, and the like due to reduction of number of parts. Note that the concave surface 29 may be a cylindrical lens extending in the direction perpendicular to the paper to diverge light in one direction, or the concave surface 29 may have a shape rotated about its optical axis as a center to diverge light in all directions.

FIGS. 10(A) and (B) show examples in which the diffracted light 12 diffracted by the hologram 31 of the polarization beam splitter 1 is modified. The hologram 31 of FIG. 10(A) interferes with at least some of the incident light 11 entering the hologram layer 3 from outside the substrate 2 via the portion 24 of the side surface of the substrate 2 to generate parallel light oblique to the hologram layer 3 as the diffracted light 12 toward the back surface 22. The diffracted light 12 is refracted by and emitted obliquely from the back surface 22 of the substrate 2. The hologram 31 of FIG. 10(A) can be manufactured by the manufacturing method of FIG. 3(A) for example, and in this case, the optical axis of the incident light 11 and the optical axis of the diffracted light 12 are orthogonal to each other. The undiffracted light 13 that has not interfered with the hologram 31 is totally reflected by the surface of the polarization beam splitter 1 and emitted outside the substrate 2 from the portion 25 of the other side surface. In the polarization beam splitter 1 of FIG. 10(A), the intersection angle of two light fluxes during recording can be 90° so as to increase extinction ratio.

The hologram 31 of FIG. 10(B) interferes with at least some of the incident light 11 incident on the hologram layer 3 from outside the substrate 2 via the portion 24 of the side surface of the substrate 2 so as to generate divergent light perpendicular to the hologram layer 3 as the diffracted light 12a toward the back surface 22. The diffracted light 12a is refracted by the flat back surface 22 of the substrate 2 and emitted therefrom as further divergent light 12b. The hologram 31 of FIG. 10(B) can be manufactured by the manufacturing method of FIG. 7(B), for example. Also, as shown in FIG. 10(C), the hologram 31 can be manufactured by emitting the second light fluxes 45a that is parallel light onto the hologram layer 3 as divergent light 45b by a lens 57 during recording. The polarization beam splitter 1 of FIG. 10(B) can emit the diverging diffracted light 12b so that magnification of a display device can be increased using the polarization beam splitter 1 as a light source of the display device.

Figure 11:
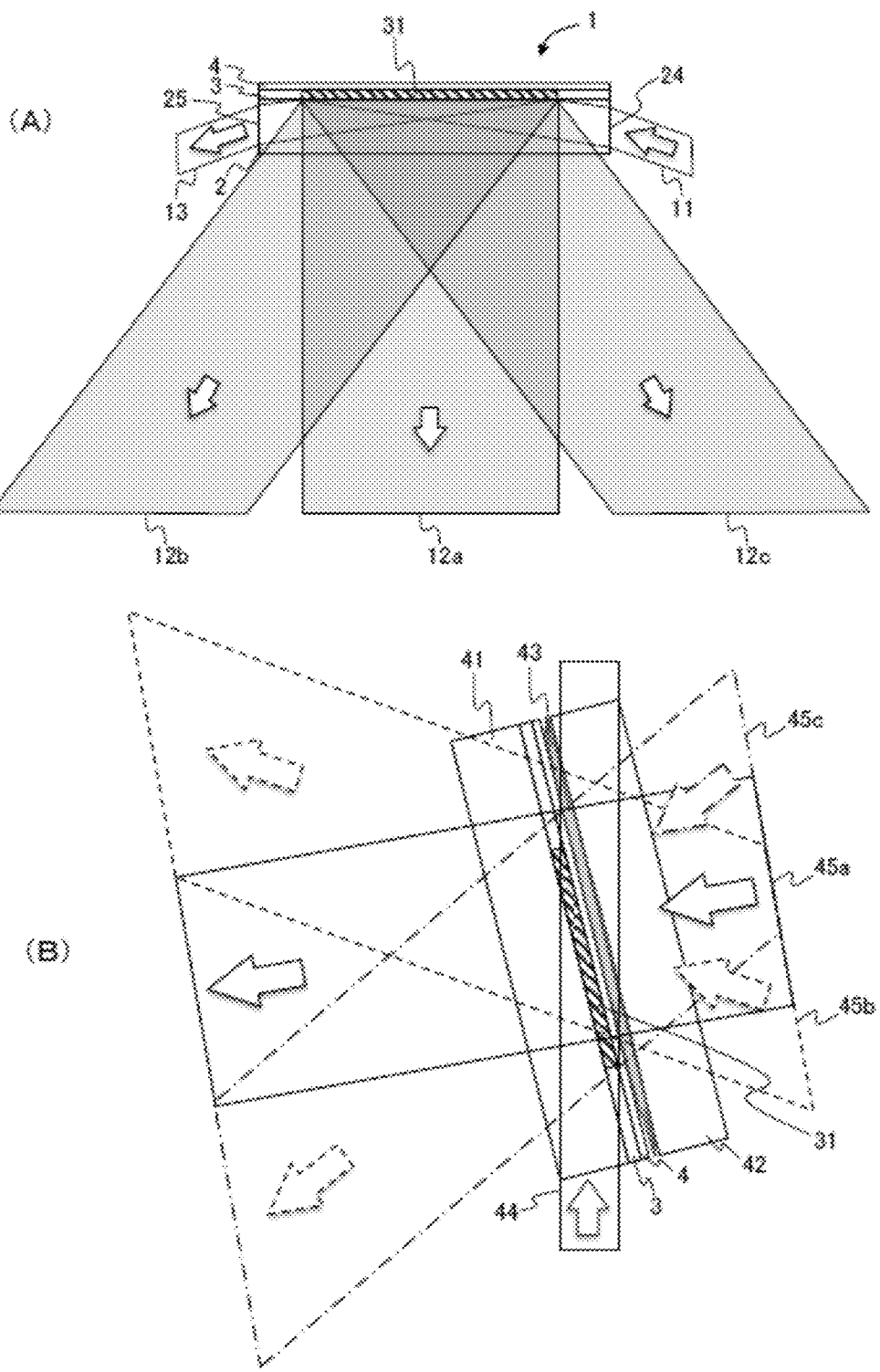
FIG. 11(A) is a diagram illustrating a variation of the polarization beam splitter of the present invention.
FIG. 11(B) is a diagram illustrating another manufacturing method of the hologram of the present invention.

FIG. 11(A) shows an example in which the hologram 31 of the polarization beam splitter 1 is multiply recorded, and a plurality of diffracted lights 12a, 12b, 12c are made generated from the holograms 31. The hologram 31 in FIG. 11(A) interferes with at least some of the incident light 11 incident on the hologram layer 3 from outside the substrate 2 via the portion 24 of the side surface of the substrate 2 so that the parallel light 12a perpendicular to the hologram layer 3 and the parallel lights 12b, 12c oblique to the hologram layer 3 can be generated as diffracted lights toward the back surface 22. They are emitted from the back surface 22 of the substrate. For the hologram 31 of FIG. 11(A), a plurality of holograms 31 can be multiply recorded at the same position on the hologram layer 3 by sequentially or simultaneously recording a plurality of second light fluxes 45a, 45b, 45c with respect to common first light flux 44 during recording as shown in FIG. 11(B), for example. The polarization beam splitter 1 of FIG. 11(A) can irradiate a wide range by a plurality of diffracted lights 12a, 12b, 12c and the viewing angle of the display device can be increased when it is used as a light source of the display device. Also, by multiply recording the second light fluxes 45a, 45b, 45c with different wavelengths, illumination lights with different traveling directions for each wavelength can be generated.

FIGS. 12(A) and (B) show examples of the polarization beam splitter 1 using the transmissive hologram 32. The polarization beam splitter 1 of FIG. 12 is an example employing the transmissive hologram 32 in the structure similar to that in FIG. 8(A), and includes the substrate 2 having the inclined side surface 23, the hologram layer 3 provided on the front surface 21 of the substrate 2, and the base film 4. The hologram layer 3 includes the transmissive hologram 32. In the polarization beam splitter 1 of FIG. 12, as shown in FIG. 12(A), the incident light 11 having the optical axis parallel to the hologram layer 3 enters the portion 24 of the inclined side surface 23, and the incident light 11 is refracted by the incident surface and obliquely enters the hologram layer 3 at an incident angle not less than the critical angle so as to interfere with the hologram 31 so that the diffracted light 17 can be generated perpendicularly to the hologram layer 3 toward the base film 4 from the hologram 31. The undiffracted light 13 that has not interfered with the hologram 31 among the incident light 11 is totally reflected by the surface of the polarization beam splitter 1 (boundary face of the hologram layer 3 or surface of the base film 4) and refracted by the portion 25 of the other inclined side surface and emitted with an optical axis parallel to the hologram layer 3. Also, as shown in FIG. 12(B), for the incident light 18 perpendicularly incident via the base film 4, the diffracted light 15 in opposite direction to the incident light 11 of FIG. 12 is generated, refracted by the portion 24 of the inclined side surface 23 and emitted with an optical axis parallel to the hologram layer 3. The undiffracted light 19 passes through the hologram layer 3 and the substrate 2 and is emitted outside from the back surface 22 of the substrate 2. In FIGS. 12(A) and (B), the polarization beam splitter 1 using the transmissive hologram 32 is configured by the manufacturing method of FIG. 7(A) in which the direction of the second light flux 45 is inverted so as to irradiate the hologram layer 3 from the side of the first optical element 41 for recording in the manufacturing method of FIG. 7(A). Therefore, the transmission hologram 32 can be manufactured by the first light flux 44 and the second light flux 45. Note that, although the example employing the transmissive hologram 32 in the structure similar to that in FIG. 8(A) is described in FIG. 12, the transmissive hologram can be used in the same manner also in other configurations.

[Verification Experiment of Transmissive Hologram]

Figure 13:
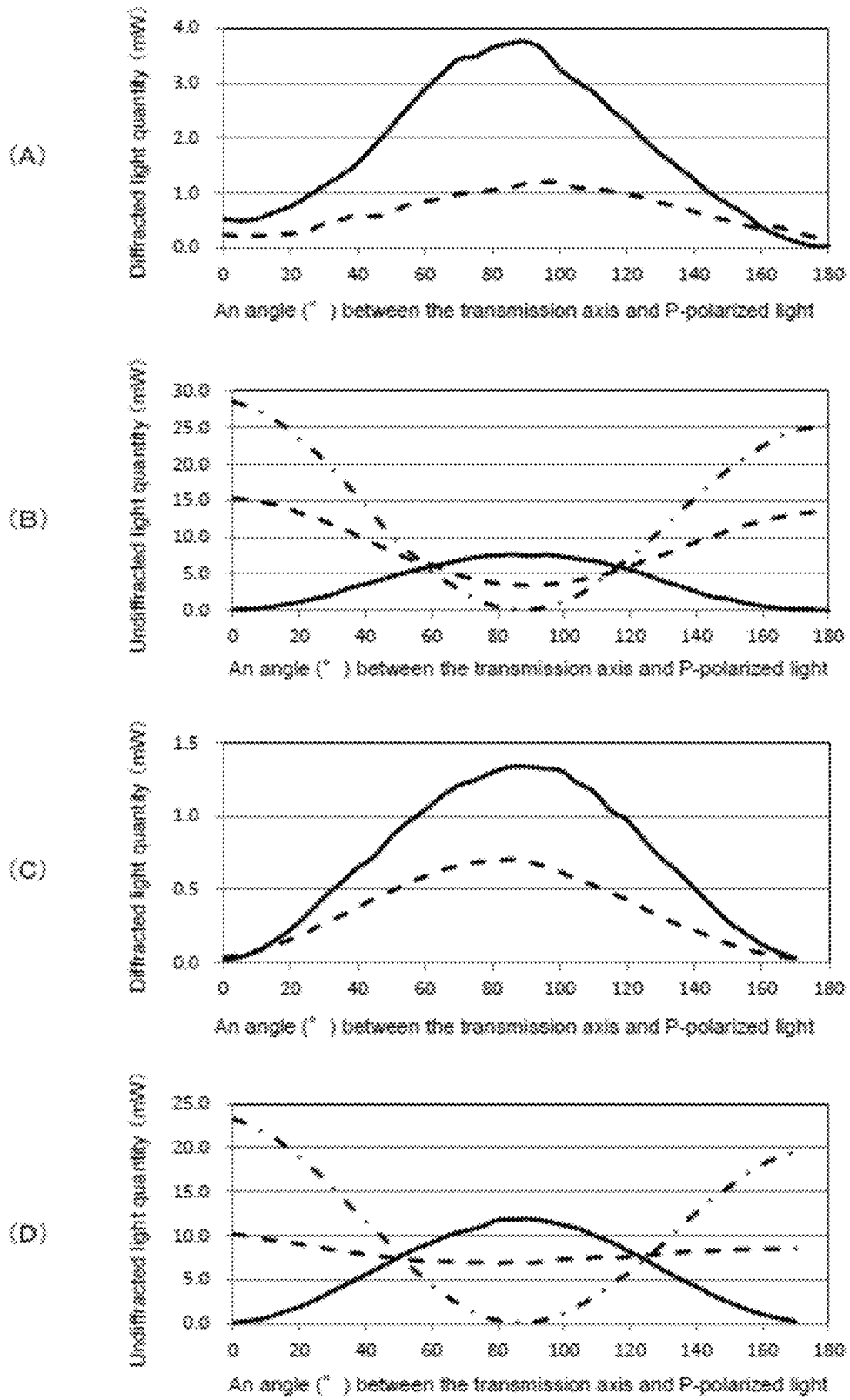
FIG. 13 shows a measurement result of quantity of diffracted light (A), (C) and quantity of undiffracted light (B), (D) of the transmissive hologram ((A) and (B) are of a hologram recorded using two S-polarized lights, and (C) and (D) are of a hologram recorded using two circularly polarized lights).

FIG. 13 shows a distribution of quantity of diffracted light and undiffracted light (transmitted light) of the transmissive hologram 32 of the present invention with respect to angle of the transmission axis of the analyzer 54. The transmissive hologram 32 was manufactured by the manufacturing method of FIG. 3(B) under the similar conditions to those in the verification experiment of the reflective hologram. Note that, although the holograms 32 manufactured by using three combinations of the first light flux 44 and the second light flux 45, i.e., two S-polarized lights, two circularly polarized lights, and two P-polarized lights were recorded, no diffracted light was confirmed for the hologram manufactured by using two P-polarized lights, so that only results of the former two combinations are described. For each of the recorded holograms 32, quantity of diffracted light and undiffracted light was measured using the transmissive hologram under the arrangements of FIGS. 4(A) and (B). That is, under the same arrangement as that during recording, the light flux 51 for reproduction was emitted onto the hologram 32 via the side surface of the first optical element 41 for recording at the same angle as that of the first light flux 44, and diffracted light generated from the hologram 32 was detected by the detector 55 via the aperture (opening) 53 and the high performance analyzer 54. Also, the light flux 57 for reproduction was emitted onto the hologram 32 via the back surface of the first optical element 41 for recording at the same angle as that of the second light flux 45, and undiffracted light transmitted via the hologram 32 was detected in a similar manner. The quantity of the light flux 51 for reproduction corresponding to the first light flux 44 was calculated by converting it into an area ratio of light received by the detector 55 to be about 5.5 mW, and the quantity of the light flux 57 for reproduction corresponding the second light flux 45 was calculated by converting it into the area ratio of light received by the detector 55 to be about 29 mW. FIG. 13(A) shows a measurement result of diffracted light of the hologram 32 manufactured by two S-polarized lights, FIG. 13(B) shows a measurement result of undiffracted light of the hologram 32 manufactured by two S-polarized lights, FIG. 13(C) shows a measurement result of diffracted light of the hologram manufactured by two circularly polarized lights, and FIG. 13(D) shows a measurement result of undiffracted light of the hologram 32 manufactured by two circularly polarized lights. A vertical axis represents diffracted light quantity (mW) in (A) and (C) as well as undiffracted light quantity (mW) in (B) and (D). A horizontal axis represents an angle) (° between the transmission axis of the analyzer 54 and P-polarized light. The light quantity was detected at each angle on the way from the direction parallel to P-polarized light (0°) to 180°. Also, a solid line represents a result in a case where S-polarized light flux for reproduction is emitted, a dotted line represents a result in a case where circularly polarized light flux for reproduction is emitted, and a dashed-dotted line in FIGS. 13(B) and (D) represents a result in a case where P-polarized light flux for reproduction is emitted. Note that, in FIGS. 13(A) and (C), the light quantity in the case of emitting P-polarized light flux for reproduction took a maximum value of not more than 1/100 of the quantity of light flux for reproduction (emission light) to reproduce hologram, and thus no substantial diffraction occurred.

FIGS. 13(A) and (C) show that the transmissive hologram 32 interfered with S-polarized light flux for reproduction and defracted some of it is to generate diffracted light. However, the transmissive hologram 32 did not interfere with P-polarized light flux for reproduction to generate no substantial diffracted light. Even when circularly polarized light flux for reproduction was emitted, diffracted light was substantially S-polarized light (90°) and the light quantity of the P-polarized component (0°, 180°) of diffracted light was equivalent to the noise level under measurement environment in any of FIGS. 13 (A) and (C).

Also, as shown in FIGS. 13(B) and (D), when P-polarized light flux for reproduction is emitted via the back surface of the first optical element 41 for recording at the same angle as that of the second light flux 45 so as to detect undiffracted light (dashed-dotted line) transmitted via the hologram 32, a transmitted light quantity at 0° indicating the P-polarized component is substantially equal to incident light quantity, and a transmitted light quantity at 90° indicating the S-polarized component is substantially zero. Therefore, it can be found that P-polarized light is not diffracted and almost all light is transmitted as non-interfering light. In contrast, when a polarization plane of the P-polarized light flux is converted into S-polarized light with the same light quantity, it can be found that the maximum value of quantity of light transmitted as undiffracted light (solid line, vicinity of 90°) is smaller than the quantity of undiffracted light in the case of the P-polarized light flux for reproduction (dashed-dotted line). Specifically, for the hologram manufactured by two S-polarized lights (FIG. 13(B)), the maximum quantity of undiffracted light for the P-polarized light flux for reproduction was 28.5 mW, whereas the maximum quantity of undiffracted light for the S-polarized light flux for reproduction was 7.6 mW. For the hologram manufactured by two circularly polarized lights (FIG. 13(D)), the maximum quantity of undiffracted light for the P-polarized light flux for reproduction was 23.3 mW, whereas the maximum quantity of undiffracted light for the S-polarized light flux for reproduction was 11.9 mW. The transmittance for S-polarized light was not more than ½ to ⅓ times of that for P-polarized light.

These results confirm that the hologram layer including the transmissive hologram 32 of the present invention can diffract some of S-polarized light among incident light to generate S-polarized diffracted light and transmit P-polarized light and non-interfering light among S-polarized light so as to separate S-polarized light.

Figure 10:
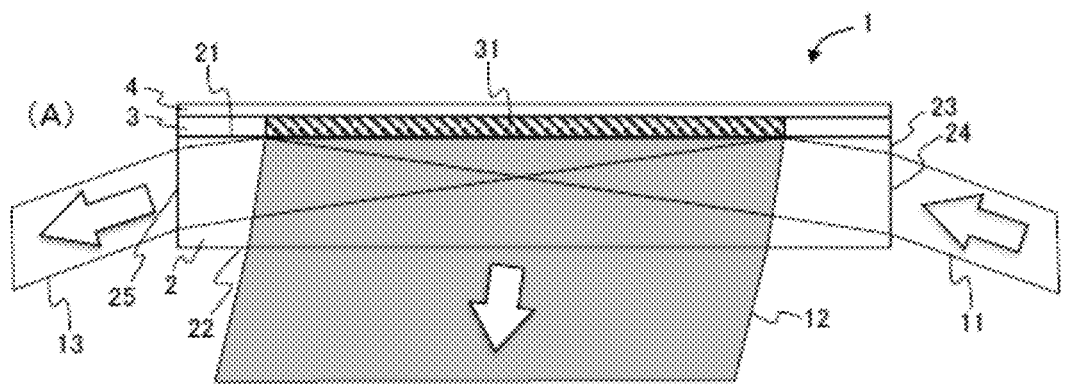
FIGS. 10(A) and (B) are diagrams illustrating variations of the polarization beam splitter of the present invention.
FIG. 10(C) is a diagram illustrating another manufacturing method of the hologram of the present invention.
Figure 10:
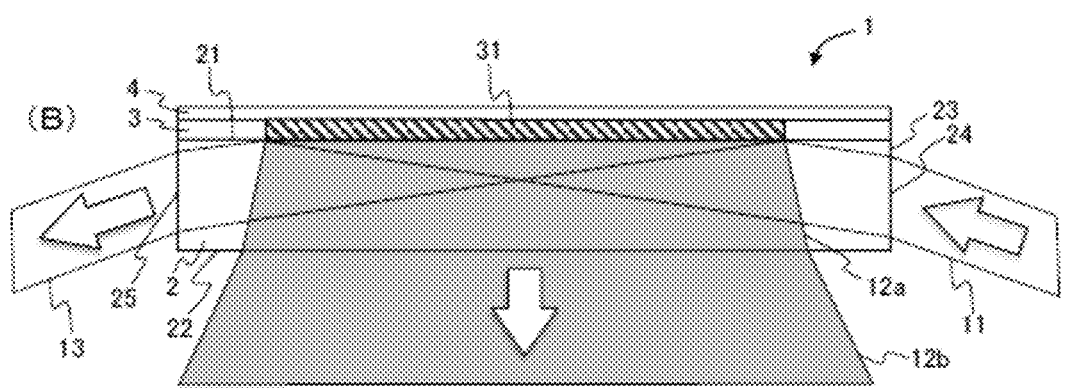
Figure 10:
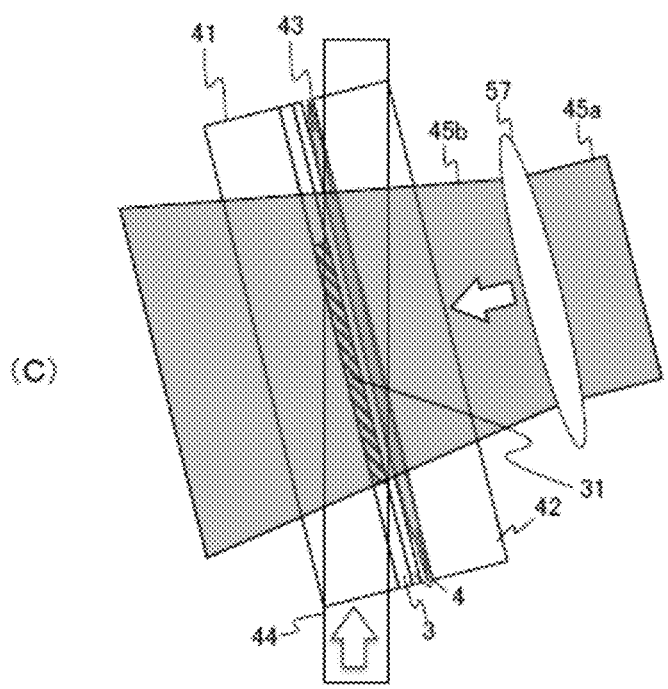

In the above-mentioned variations of the polarization beam splitter 1, each of the changes is interchangeable. For example: FIG. 8(B) and FIG. 8(C) may be combined to sandwich the hologram layer with the first substrate and the second substrate whose side surfaces are formed by curved surfaces; the back surface in FIG. 8(A) may be the concave surface as shown in FIG. 9(C); or the polarization beam splitters 1 of FIG. 8(A) to (C) may be configured to generate oblique diffracted light, diverging diffracted light, and a plurality of diffracted lights from the hologram 31 as shown in FIGS. 10 (A), (B), and FIG. 11(A).

[Embodiments of Surface Light Source Device]

Figure 14:
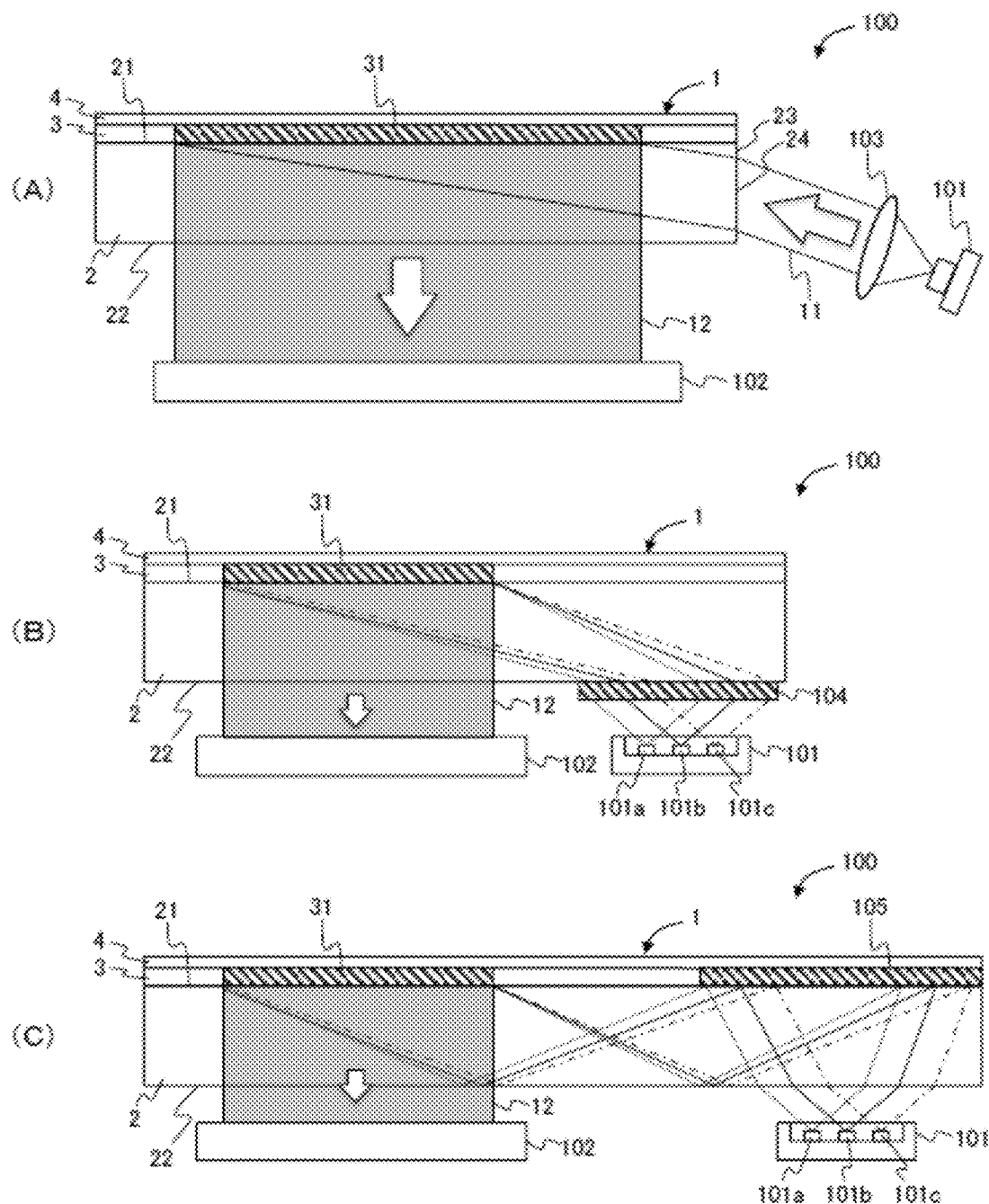
FIG. 14 is a schematic diagram illustrating an embodiment of a surface light source device of the present invention.

FIG. 14 is a diagram illustrating some embodiments of a surface light source device 100 of the present invention. The surface light source device 100 of the present invention includes a light source 101, the polarization beam splitter 1, and an optical system (an optical system for incident light) configured such that light emitted from the light source 101 enters a predetermined state on the hologram layer 3 of the polarization beam splitter 1. The surface light source device 100 emits planar light and irradiate an illuminated member 102 with the diffracted light 12 generated by the reflective hologram 31 of the polarization beam splitter 1 and emitted from the back surface of the substrate 2, the diffracted light 17 generated by the transmissive hologram 32 and emitted from the base film 4, and the like. Note that, undiffracted light is not shown in FIG. 14.

The light source 101 emits light having a wavelength interfering with the hologram. An LED, a light bulb, a xenon lamp, a semiconductor laser, an organic EL device, an ultra-small fluorescent tube, or the like can be employed as the light source 101.

As described above, the polarization beam splitter 1 includes at least the translucent substrate 2 and the hologram layer 3 provided on the front surface 21 of the substrate 2, and the hologram layer 3 includes the reflective hologram 31 or the transmissive hologram 32. When the incident light 11 is incident in a predetermined state, the reflective hologram 31 or the transmissive hologram 32 interferes with at least some of the incident light 11 and generates planner diffracted light 12 or diffracted light 17.

The optical system for incident light is for making the incident light 11 incident in a predetermined state to the reflective hologram 31 or the transmissive hologram 32 of the hologram layer 3, and includes the substrate 2 of the polarization beam splitter. The optical system for incident light may further includes: an optical element for shaping light emitted from the light source to a predetermined size and shape; an optical element for deflecting traveling direction of light; an optical element for changing polarization state of light; and the like. For example, a part of the optical system for incident light may be a second hologram provided on the front surface 21 or the back surface 22 of the substrate 2.

The second hologram is a transmissive or reflective hologram and interferes with light from the light source to generate diffracted light having a predetermined angle inside the substrate. The predetermined angle is preferably an angle at which light cannot enter the side of the front surface or the back surface of the substrate due to the relation of refractive index, and preferably not less than the critical angle of the substrate with respect to air. The second hologram is preferably multiply recorded for each light of each color to interfere with red, blue, and green lights for color display. The second hologram can generate the incident light 11 interfering with the hologram 31 inside the substrate 2 even from the front surface 21 or the back surface 22 of the substrate 2.

The illuminated member 102 is irradiated with light from the surface light source device 100, and is not limited to a specific member. Examples thereof include a liquid crystal display panel, an illuminated sign, an internally illuminated sign, a hologram, and the like.

FIG. 14(A) shows one embodiment of the surface light source device 100 which includes the light source 101, a lens 103 that converts light emitted from the light source 101 to parallel light, and the polarization beam splitter 1. In the surface light source device 100 of FIG. 14(A), the light source 101 is arranged such that an emission direction corresponds to the incident angle of the incident light 11, light emitted from the light source 101 is shaped into parallel light by the lens 103 that is a part of the optical system for incident light, and the incident light 11 enters the side surface 23 of the substrate 2 at a predetermined angle. At least some of the incident light 11 interferes with the hologram 31 of the hologram layer 3 inside the substrate 2, and the planar diffracted light 12 is generated from the hologram 31 and emitted from the back surface 22 of the substrate 2 to illuminate the illuminated member 102. Although the light source is arranged to provide the incident angle of the incident light 11 in FIG. 14(A), the orientation of the light source 101 can be varied by using various optical elements as the optical system for incident light. Also, a polarizer or a wave-length plate may be arranged as the optical system for incident light between the light source 101 and the portion 24 of the side surface 23 of the substrate 2 to make the incident light 11 be in a desired polarization state.

FIG. 14(B) shows one embodiment of the surface light source device 100 which includes the light source 101 provided on the back surface side of the substrate 2, and the polarization beam splitter 1. Furthermore, a second hologram 104 is provided on the back surface 22 of the substrate 2 of the polarization beam splitter 1 as a part of the optical system for incident light. The polarization beam splitter 1 of the FIG. 14(B) includes the hologram 31 on the front surface of a portion of the substrate 2, and the second hologram 104 is provided on the back surface 22 of another portion of the substrate 2 where no hologram 31 is provided. The light source 101 of FIG. 14(B) includes three light sources, which are a red LED 101a, a green LED 101b, and a blue LED 101c, enabling color display.

The second hologram 104 in FIG. 14(B) is a transmissive hologram which interferes with light incident from outside the polarization beam splitter to generate diffracted light having a predetermined angle inside the substrate. That is, the second hologram 104 of FIG. 14(B) generates diffracted light (dotted line) having a first wavelength and a predetermined angle toward the hologram 31 inside the substrate 2 when light (dotted line) having the first wavelength emitted from the red LED 101a is incident from outside. Likewise, the second hologram 104 generates diffracted light (solid line) having a second wavelength and a predetermined angle toward the hologram 31 inside the substrate 2 when light (solid line) having the second wavelength emitted from the green LED 101b is incident from outside, and generates diffracted light (dashed-dotted line) having a third wavelength and a predetermined angle toward the hologram 31 inside the substrate 2 when light (dashed-dotted line) having the third wavelength emitted from the blue LED 101c is incident from outside. When diffracted lights having the first wavelength to the third wavelength enter the hologram 31, the hologram 31 generates planar diffracted light which illuminates the illuminated member 102 via the back surface of the substrate 2. The second hologram 104 may be provided by attaching a separately-manufactured hologram on the back surface of the substrate 2, or providing a second hologram layer on the back surface of the substrate 2 and recording a hologram in the second hologram layer 2.

FIG. 14(C) shows one embodiment of the surface light source device 100 which includes the light source 101 disposed on the back surface side of the substrate 2, and the polarization beam splitter 1. Furthermore, a second hologram 105 is provided on the front surface 21 of the substrate 2 of the polarization beam splitter 1 as a part of the optical system for incident light. The polarization beam splitter 1 of FIG. 14(C) includes the hologram 31 on a portion of the front surface of the substrate 2, and is provided with the second hologram 105 on another portion thereof. The light source 101 of FIG. 14(C) includes the three light sources, which are the red LED 101a, the green LED 101b, and the blue LED 101c, enabling color display.

The second hologram 105 of FIG. 14(C) is a reflective hologram which interferes with light incident via the substrate 2 from the back surface side of the substrate 2 to generate diffracted light having a predetermined angle inside the substrate. In FIG. 14(C), the light (dotted line) having the first wavelength, the light (solid line) having the second wavelength, and the light (dashed-dotted line) having the third wavelength emitted from the red LED 101a, the green LED 101b, and the blue LED 101c that are disposed on the back surface side of the substrate 2, respectively, are refracted and enter inside from the back surface 22 of the substrate 2 so as to enter the second hologram 105. The second hologram 105 interferes with the light (dotted line) having a first wavelength to generate diffracted light (dotted line) having the first wavelength and an angle not less than the critical angle of the substrate 2; interferes with the light (solid line) having a second wavelength to generate diffracted light (solid line) having the second wavelength and an angle not less than the critical angle of the substrate 2; and interferes with the light (dashed-dotted line) having a third wavelength to generate diffracted light (dashed-dotted line) having the third wavelength and an angle not less than the critical angle of the substrate 2. Each diffracted light is totally reflected by the back surface of the substrate 2 and enters the hologram 31. When diffracted lights having the first wavelength to the third wavelength enter the hologram 31, the hologram 31 generates planar diffracted light which illuminates the illuminated member 102 via the back surface of the substrate 2. The second hologram layer 105 may be formed in another portion of the hologram layer 3, or provided by attaching a separately-manufactured hologram on the front surface 21 of the substrate 2.

Note that, when the light source is disposed on the front surface side of the substrate 2, it is sufficient that transmissive and reflective holograms are provided as the second holograms with inverting the types of them with respect to those in FIGS. 14(B) and (C). For example, when the second hologram is provided on the front surface 21 of the substrate 2, it is sufficient that the second hologram shall be a transmission type so that light from the light source incident via the base film 4 is deflected and incident inside the substrate 2 at a predetermined angle. Also, when the second hologram is provided on the back surface 22 of the substrate 2, it is sufficient that the second hologram shall be a reflection type, and light from the light source incident via the base film 4, the hologram layer 3, and the substrate 2 is reflected as diffracted light having not less than the critical angle.

[Embodiments of Display Device]

A display device 200 of the present invention includes the surface light source device 100 (light source is not shown), and a display element 201 which is irradiated with light emitted from the surface light source device 100. The display element 201 is preferably disposed adjacent to a front surface side or a back surface side of the surface light source device 100 because of using a planar light source. The surface light source device 100 serves as a back light or a front light for the display element and can emit only S-polarized light, which is the same result as that in a case where light passes through a polarizer.

The display element 201 may be a reflective or transmissive one, and a plurality of pixels are arrayed in a matrix therein. The display element displays an image by changing transmittance, polarization state, and the like of incident light for each pixel. The display element 201 of various types can be used. A transmissive liquid crystal display device (LCD), a reflective LCD (including liquid crystal on silicon (LCOS)), a digital micromirror device (DMD), an electronic paper, or the like can be used as the display element 201. For the reflective display element, the surface light source device 100 is disposed on a front surface side of the display element 201, and an image of the display element 201 is displayed via the surface light source device 100. Accordingly, for at least an ON display pixel, light emitted from the front surface side of the display element has to pass through the hologram layer 3 of the polarization beam splitter 1 of the surface light source device 100, so that the light has to contain P-polarized component. Since the surface light source device 100 emits S-polarized light, a display element (e.g., reflective LCD) that changes polarization state of light is preferably employed as the display element 201. However, also in a display element that changes transmittance of light, polarization direction can be rotated by 90° by transmitting light pass through a quarter wavelength plate two times so as to convert the light into P-polarized light. For example, when a quarter wavelength plate is disposed on an incident surface of the display element 201, S-polarized light emitted from the surface light source device 100 is converted into circularly polarized light when the S-polarized light enters the display element 201, and the circularly polarized light reflected by an pixel electrode is converted into P-polarized light when the circularly polarized light is emitted from the display element 201, allowing the P-polarized light to pass through the hologram of the polarization beam splitter 1. Note that, light is elliptically polarized to include S-polarized component and P-polarized component for a halftone pixel in the display element 201, so that transmitted light having an intensity that depends on a proportion of P-polarized component is displayed.

Figure 15:
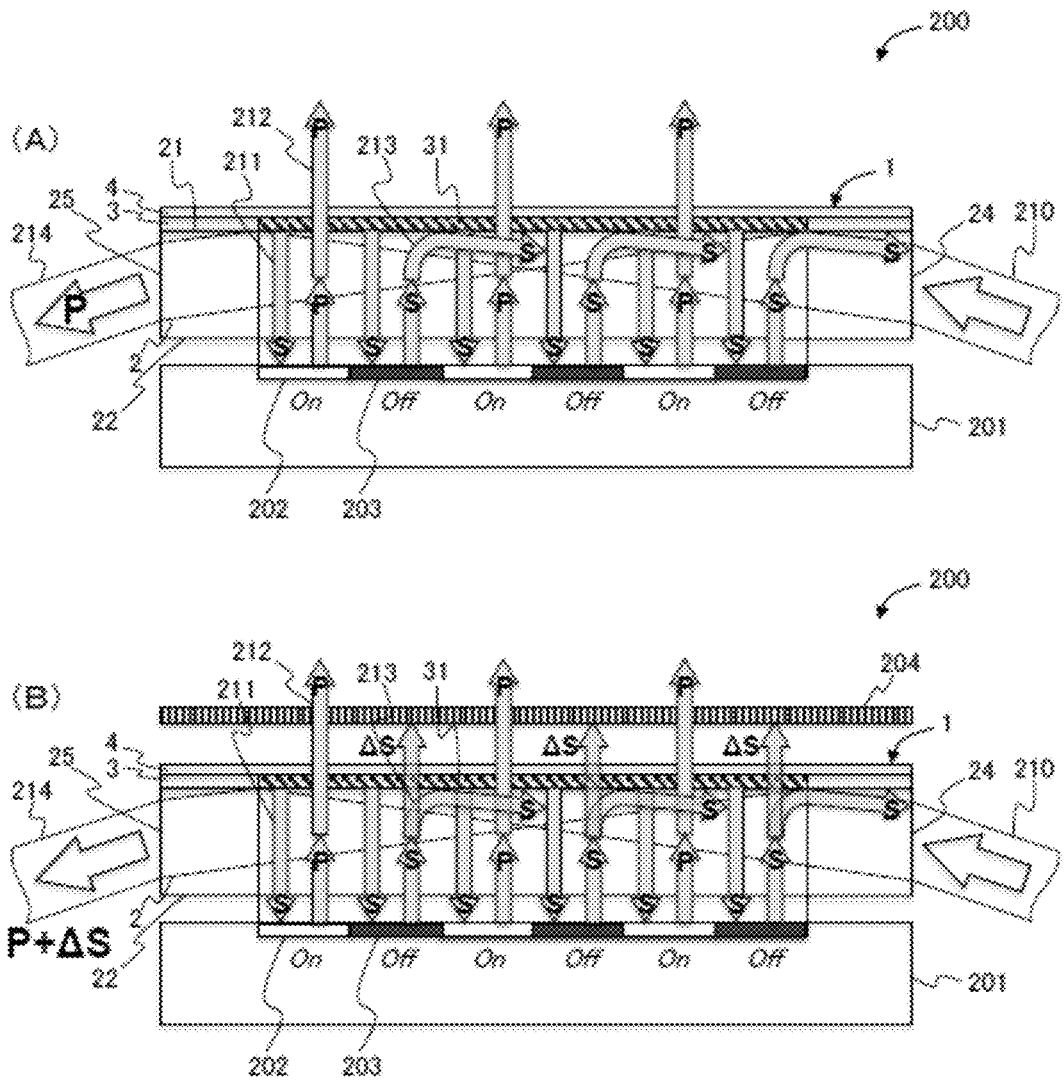
FIG. 15 is a schematic diagram illustrating an embodiment of a display device of the present invention.

FIG. 15(A) shows an example of the display device 200 of the present invention. The display device 200 includes a reflective display element 201, and the surface light source device 100 (light source is not shown in the drawing) disposed on the front surface side of the display element 201. The display element 201 in FIG. 15 is a reflective liquid crystal display element configured to reflect light incident from the front surface side by a pixel electrode and emit it again from the front surface side. For an ON display pixel 202, a polarization direction is rotated by 90° while light passes through a liquid crystal layer, and for an OFF display pixel 203, the polarization direction is not changed in the liquid crystal layer. Note that an inner configuration of the reflective display element 201 is omitted.

Light 210 from the light source not shown is incident via the portion 24 of the side surface of the substrate 2 of the polarization beam splitter 1 of the surface light source device 100, and at least some of the light 210 interferes with the hologram 31 of the hologram layer 3 to generates S-polarized diffracted light 211. The S-polarized diffracted light 211 is emitted from the back surface 22 of the substrate 2 and enters the display element 201. The S-polarized diffracted light 211 incident on the ON pixel 202 of the display element 201 is rotated by 90° in its polarization direction when passing through the liquid crystal layer and converted to P-polarized light 212, which is emitted from the front surface of the display element 201. The P-polarized light 212 emitted from the front surface of the display element 201 enters the hologram 31 via the back surface 22 of the substrate 2, but does not interfere with the hologram 31 because of P-polarized light and is transmitted via the hologram layer 3 and the base film 4. In contrast, the S-polarized diffracted light 211 incident on the OFF pixel 203 of the display element 201 is not changed in its polarization direction even after passing through the liquid crystal layer, and is emitted from the front surface of the display element 201 as it is. The S-polarized light 213 emitted from the front surface of the display element 201 enters the hologram 31 via the back surface 22 of the substrate 2, reflected by the hologram 31, and emitted from the portion 24 of the side surface of the substrate. Also, undiffracted light 214 that has not interfered with the hologram 31 is totally reflected by the surface of the polarization beam splitter 1 and emitted outside the substrate 2 from the portion 25 of the other side surface.

FIG. 15(A) shows an operation in a case where diffraction efficiency of the hologram 31 is high and the hologram 31 interferes with almost all of the incident S-polarized light. Diffraction efficiency may be lowered due to the material of the hologram layer 3, wavelength of the light used, and the like, and in this case, a component corresponding to diffraction efficiency of the incident S-polarized light interferes with the hologram 31, and the rest of the light becomes undiffracted light. In such a case, it is sufficient that a polarizing plate 204 that transmits only the P-polarized component is disposed on a surface of the polarization beam splitter 1 opposite to the display element 201 as shown in FIG. 15(B).

In FIG. 15(B), the light 210 from the light source is incident via the portion 24 of the side surface of the substrate 2 of the polarization beam splitter 1 of the surface light source device 100, and some of the S-polarized component of the light 210 corresponding to diffraction efficiency interferes with the hologram 31 of the hologram layer 3 to generate the S-polarized diffraction light 211 which enters the display element 201, while the rest ΔS of the S-polarized component of the light 210 is emitted outside the substrate 2 from the portion 25 of the other side surface as the undiffracted light 214 together with the P-polarized component. The P-polarized light 212 emitted from the front surface of the display element 201 is similar to that in FIG. 15(A), while the S-polarized light 213 enters the hologram 31 via the back surface 22 of the substrate 2 and some of the S-polarized light 213 corresponding to diffraction efficiency interferes with the hologram 31 and is emitted from the portion 24 of the side surface of the substrate. The rest ΔS of the S-polarized light that has not interfered passes through the hologram layer 3 and the base film 4, but fails to pass through the polarizing plate 204 disposed adjacent to the polarization beam splitter 1, resulting in a non-display pixel.

Figure 16:
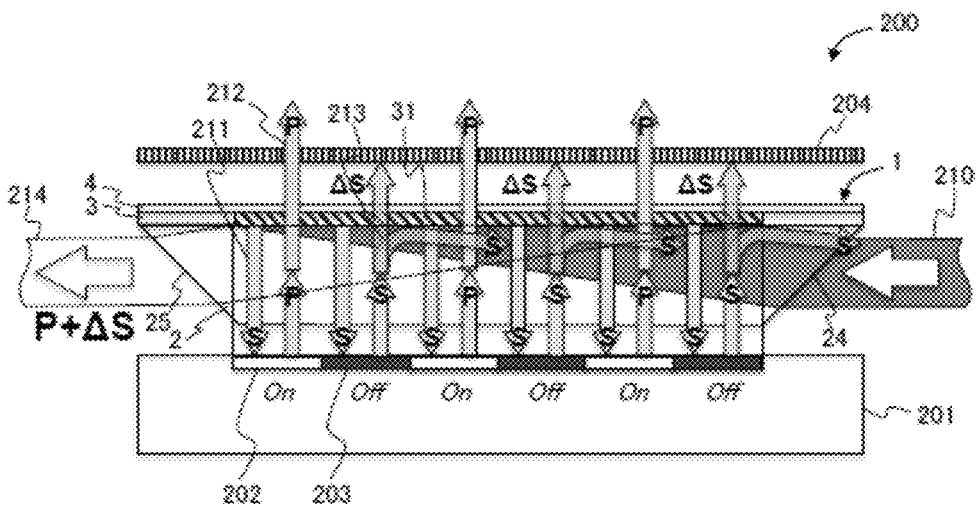
FIG. 16 is a schematic diagram illustrating an embodiment of the display device of the present invention.

FIG. 16 shows another example of the display device 200 of the present invention, which uses the polarization beam splitter 1 in which the side surface of the substrate 2 is inclined, and is configured such that the light 210 from the light source is incident in parallel to the front surface of the display element 201 and the undiffracted light 214 is emitted in parallel thereto. A display operation in the polarization beam splitter and the display device is similar to that in FIG. 15. Such a configuration makes design and alignment of the optical system easy.

Also, although not shown in the drawings, a reflective display element can be arranged as the illuminated member 102 in FIGS. 14(B) and (C) so as to form an integrated display device unit in which the display element and the light source are mounted on the same substrate and the polarization beam splitter 1 is disposed thereover. In FIG. 14(C), a gap exists between the light source 101 and the display element, which is the illuminated member 102, so that a CPU, a memory, or the like may be mounted in this area.

Figure 17:
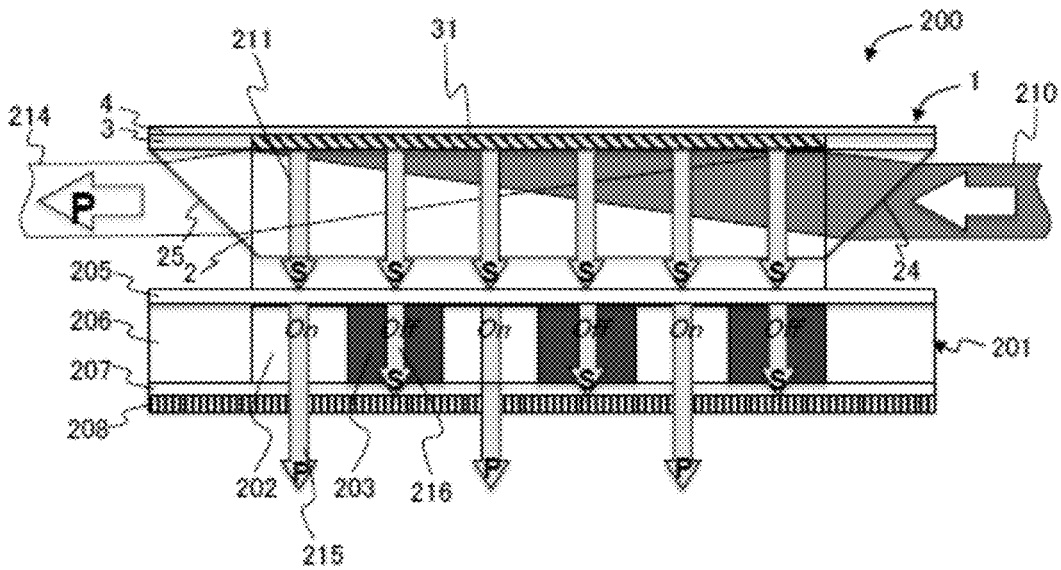
FIG. 17 is a schematic diagram illustrating an embodiment of the display device of the present invention.

FIG. 17 is an example of the display device 200 of the present invention which uses the surface light source device as a backlight of a transmissive display element 201. The configuration of the surface light source device is same as that in FIG. 16. In the transmissive display element 201, a liquid crystal layer 206 is enclosed between a first translucent substrate 205 and a second translucent substrate 207, and a polarizing plate 208 that transmits only P-polarized light is disposed on an outer surface of the second substrate 207. A plurality of pixels is arranged in a matrix in the display element 201, and a transparent pixel electrode is formed in each pixel to be able to control voltage in the pixel. Orientation scheme and driving method of liquid crystal is not specifically limited, and various display elements are available such as TN type, IPS type, VA type, or OCB type. The ON display pixel 202 of the display element 201 is configured to rotate a polarization direction of linearly polarized light incident from the first substrate by 90° while the linearly polarized light passes through the liquid crystal layer 206, and the OFF display pixel 203 is configured not to change the polarization direction in the liquid crystal layer. However, in the case of the transmissive display element, the transmission axis of the polarizing plate 208 can be varied so as to invert operation for the ON display pixel and operation for the OFF display pixel by disposing a polarizing plate that transmits only S-polarized light.

In FIG. 17, the light 210 from a light source not shown is incident via the portion 24 of the side surface of the substrate 2 of the polarization beam splitter 1 of the surface light source device 100, at least some of the light 210 interferes with the hologram 31 of the hologram layer 3 to generate the S-polarized diffracted light 211, which is emitted from the back surface 22 of the substrate 2 and enters the display element 201. The polarization direction of the S-polarized diffracted light 211 entering the ON pixel 202 of the display element 201 is rotated by 90° while passing through the liquid crystal layer 206 is converted to P-polarized light 215, which passes through the second substrate 207 and the polarizing plate 208 to display an image. In contrast, the polarization direction of the S-polarized diffracted light 211 entering the OFF pixel 203 of the display element 201 is not changed even after passing through the liquid crystal layer, and passes through the second substrate 207 as S-polarized light 216 but fails to pass through the polarizing plate 208, resulting in a non-display pixel. Also, undiffracted light 214 that has not interfered with the hologram 31 is totally reflected by the surface of the polarization beam splitter 1 and emitted outside the substrate 2 from the portion 25 of the other side surface.

Figure 18:
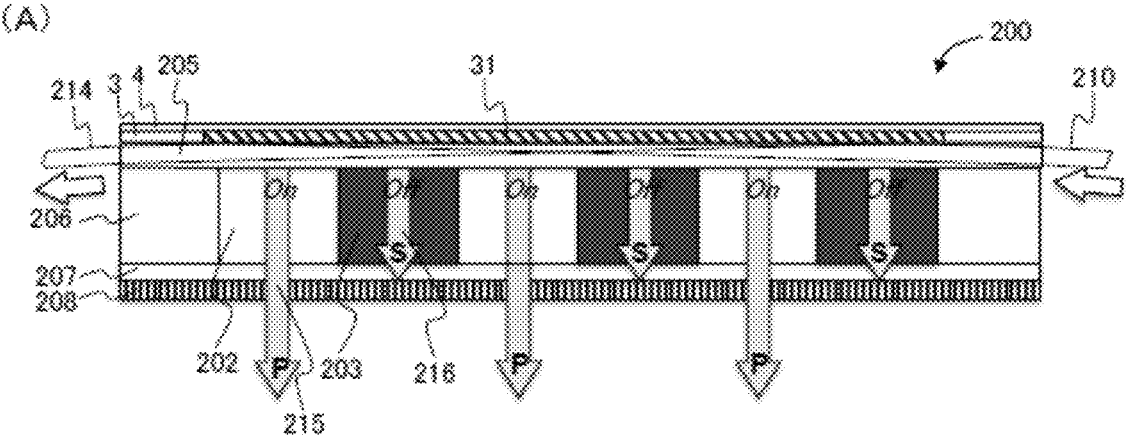
FIG. 18 is a schematic diagram illustrating an embodiment of the display device of the present invention.
Figure 18:
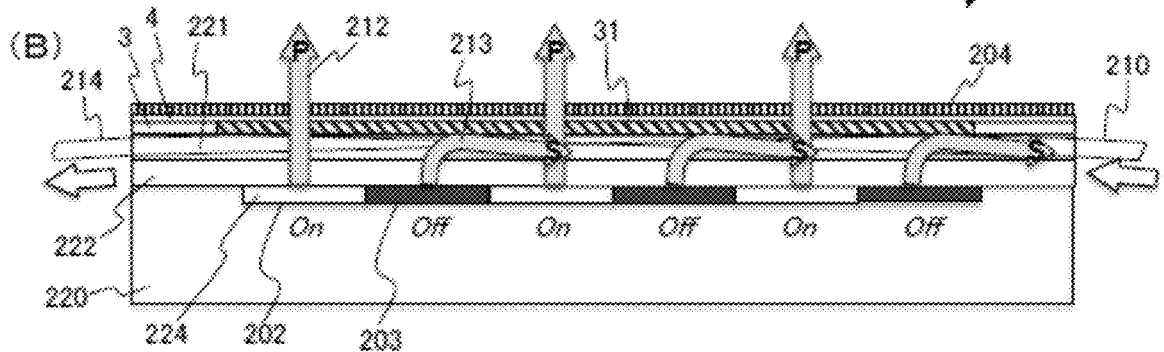
Figure 19:
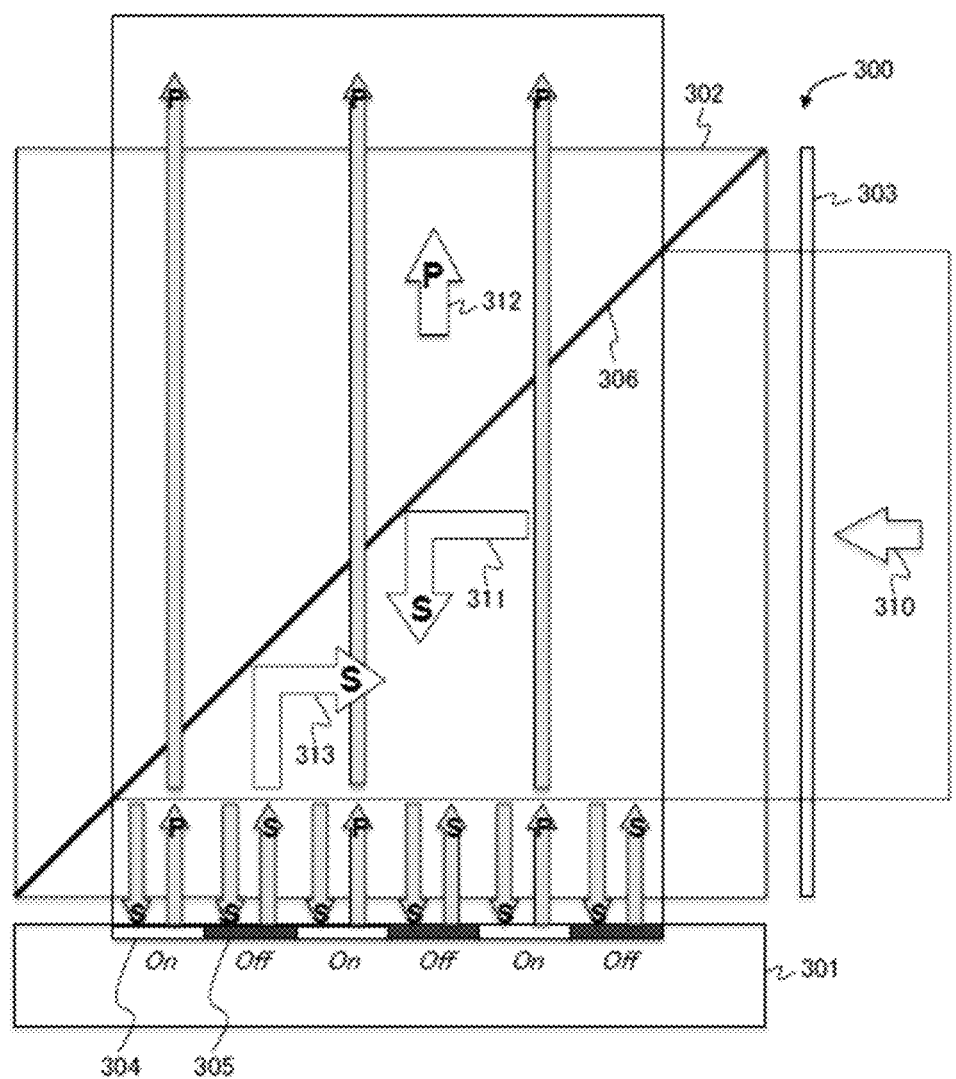
FIG. 19 is a diagram illustrating a display operation in a conventional reflective display device.

FIG. 18 shows another example of the display device 200 of the present invention which uses one of the translucent substrates of the display element 201 as a substrate for the polarization beam splitter. Such an integrated display element 201 can be simply manufactured by attaching the hologram layer 3 in which the hologram 31 has been recorded to an outer surface of the translucent substrate.

In FIG. 18(A), the hologram layer 3 in which the hologram 31 has been recorded and the base film 4 are attached to the outer surface of the first substrate 205 of the transmissive display element 201. The light 210 from the light source is incident from a side surface of the first substrate 205, and S-polarized diffracted light is generated toward the liquid crystal layer 206 from the hologram 31. In the liquid crystal layer 206, the S-polarized diffracted light for the ON pixel 202 is converted to the P-polarized light 215, and the S-polarized diffracted light for the OFF pixel 203 passes through the second substrate 207 as the S-polarized light 216. The polarizing plate 208 transmits the P-polarized light 215 and blocks the S-polarized light 216.

In FIG. 18(B), the hologram layer 3 in which the hologram 31 has been recorded and the base film 4 are attached to an outer surface of a translucent substrate 221 on a front surface side of the reflective display element 201, and the polarizing plate 204 for transmitting only the P-polarized component is disposed further outside the hologram layer 3 and the base film 4. Note that, in the reflective display element 201, a liquid crystal driving circuit (not shown) and a pixel electrode (reflective electrode) 224 are provided on a silicon substrate 220, and a liquid crystal layer 222 is enclosed between the silicon substrate 220 and the translucent substrate 221. The light 210 from a light source is incident from a side surface of the translucent substrate 221 on the front surface side to generate S-polarized light toward the liquid crystal layer 222 from the hologram 31. The S-polarized light passes through the liquid crystal layer 222, is reflected by the pixel electrode and passes through the translucent substrate 221 on the front surface side. The S-polarized diffracted light for the ON pixel 202 is converted into P-polarized light 212 while going back and forth in the liquid crystal layers 222, and the S-polarized diffracted light for the OFF pixel 203 remains in the S-polarized light 213. Accordingly, P-polarized light 212 does not interfere with the hologram 31 and passes through the hologram layer 3 and the base film 4 and further passes through the polarizing plate 204 to be displayed. The S-polarized light 213 enters the hologram 31 via the back surface 22 of the substrate 2, and some of the S-polarized light 213 interferes with the hologram 31 and is emitted from the portion 24 of the side surface of the substrate. Light that has not interfered with the hologram 31 among the S-polarized light 213 fails to pass through the polarizing plate 204, resulting in a non-display pixel.

Note that, although the embodiments using the reflective hologram 31 are illustrated as the surface light source device of the display device, the S-polarized diffracted light 17 emitted via the base film 4 can be used as a surface light source even for the transmissive hologram 32 and can be combined with a display element to provide a display device.

The plurality of embodiments has been described above in the specification. However, the applicable scope of the present invention is not limited to each of the above embodiments. For example, the plurality of embodiments can be combined with each other.

REFERENCE NUMERALS

1 Polarization beam splitter
2 Substrate
3 Hologram layer
4 Base film
11 Incident light
12 Diffracted light
13 Non-diffracted light
21 Front surface of substrate
22 Back surface of substrate 23 Side surface of substrate
31 Hologram

The invention claimed is:

1. A polarization beam splitter comprising a translucent substrate and a hologram layer provided on a front surface of the substrate, and being capable of separating S-polarized light from light incident on the hologram layer via the substrate, wherein:
the substrate comprises a back surface opposite to the front surface on which the hologram layer is provided and parallel to the front surface, and a side surface connecting the front surface and the back surface; and
the hologram layer comprises:
a hologram that diffracts at least some of S-polarized light and generates S-polarized light toward a portion of the side surface but diffracts no P-polarized light, when incident light whose optical axis is perpendicular to the hologram layer enters the hologram layer via the back surface; or
a hologram that diffracts at least some of S-polarized light among light incident on the hologram layer via a portion of the side surface to generate S-polarized light whose optical axis is perpendicular to the hologram layer toward the back surface or a side opposite to the substrate but diffracts no P-polarized light.

2. The polarization beam splitter of claim 1, wherein the hologram of the hologram layer diffracts the circularly polarized light to generate the S-polarized light having extinction ratio of 50:1 or greater.

3. The polarization beam splitter of claim 1, wherein the front surface of the substrate is a flat surface, and the back surface is a flat surface.

4. The polarization beam splitter of claim 3, wherein at least a portion of the side surface is inclined with respect to a normal of the front surface.

5. The polarization beam splitter of claim 1, comprising a second substrate on a side of the hologram layer opposite to the substrate.

6. A surface light source device, comprising:
a light source; and
the polarization beam splitter of claim 1,
wherein the surface light source device is configured such that emission light from the light source enters the hologram layer via the portion of the side surface to emit light from the back surface of the substrate or the side opposite to the substrate.

7. A surface light source device, comprising:
a light source;
the polarization beam splitter of claim 1; and
a second hologram different from the hologram is provided on the front surface or the back surface of the substrate of the polarization beam splitter, wherein:
the second hologram diffracts emission light from the light source to generate light having an incident angle larger than a critical angle of the substrate with respect to air inside the substrate; and
the hologram of the hologram layer diffracts the light having an incident angle larger than the critical angle to emit light from the back surface of the substrate.

8. A display device, comprising:
the surface light source device of claim 6; and
a display element on which light emitted from the surface light source device is irradiated.

9. A display device, comprising:
the surface light source device of claim 6; and
a pixel electrode of a display element formed on the back surface of the substrate of the surface light source device.

10. The display device of claim 8, wherein the display element displays an image by changing polarization state of incident light for each pixel.

11. The display device of claim 10, wherein the display element is a reflective display element and light reflected by the display element enters the surface light source device.

12. The display device of claim 9, wherein the display device comprises a polarizer having a transmission axis parallel to P-polarized light with respect to light emitted from the display element.

13. The polarization beam splitter of claim 1, wherein the hologram of the hologram layer generates divergent light or a plurality of lights with different traveling directions toward the back surface of the substrate.

* * * * *